(12) United States Patent
Satterfield

(10) Patent No.: US 10,569,878 B2
(45) Date of Patent: Feb. 25, 2020

(54) MOUNTING ARM ASSEMBLY

(71) Applicant: Johnny A. Satterfield, Chatsworth, CA (US)

(72) Inventor: Johnny A. Satterfield, Chatsworth, CA (US)

(*) Notice: Subject to any disclaimer, the term of this patent is extended or adjusted under 35 U.S.C. 154(b) by 506 days.

(21) Appl. No.: 15/192,912

(22) Filed: Jun. 24, 2016

(65) Prior Publication Data

US 2017/0021928 A1    Jan. 26, 2017

Related U.S. Application Data

(60) Provisional application No. 62/185,170, filed on Jun. 26, 2015.

(51) Int. Cl.
| | | |
|---|---|---|
| *B64D 11/00* | (2006.01) | |
| *B60N 2/75* | (2018.01) | |
| *B64D 11/06* | (2006.01) | |

(52) U.S. Cl.
CPC ........ *B64D 11/00153* (2014.12); *B60N 2/79* (2018.02); *B60N 2/793* (2018.02); *B64D 11/06* (2013.01); *B64D 11/0624* (2014.12); *B64D 11/0627* (2014.12); *B64D 11/0646* (2014.12)

(58) Field of Classification Search
CPC .......... B64D 11/00153; B64D 11/0624; B64D 11/06; B64D 11/0627; B64D 11/0644; B64D 11/0646; B60N 2/793; B60N 2/79; B60N 2/75; A47C 7/70; F16M 2200/06; F16M 2200/021
USPC ....... 297/188.16, 188.17, 188.15, 217.4, 150
See application file for complete search history.

(56) References Cited

U.S. PATENT DOCUMENTS

| | | | | |
|---|---|---|---|---|
| 3,629,900 A | * | 12/1971 | Beerli, Jr. .......... | E05D 11/1007 16/349 |
| 3,666,319 A | * | 5/1972 | Moloney, Jr. ........ | B60N 2/0232 297/113 |
| 5,177,616 A | * | 1/1993 | Riday ................ | B64D 11/0015 248/917 |
| 5,179,447 A | * | 1/1993 | Lain .................. | A47C 7/72 248/917 |
| 5,195,709 A | * | 3/1993 | Yasushi .............. | B64D 11/0646 248/280.11 |
| 5,398,991 A | | 3/1995 | Smith | |
| 5,547,248 A | | 8/1996 | Marechal | |
| 6,427,957 B1 | * | 8/2002 | Finneman ........... | B60N 3/002 248/185.1 |
| 7,431,365 B2 | | 10/2008 | Sturt et al. | |
| 7,604,291 B2 | * | 10/2009 | Vitito ................. | B60R 11/0211 296/37.8 |

(Continued)

FOREIGN PATENT DOCUMENTS

| | | |
|---|---|---|
| CN | 103991395 A | 8/2014 |
| WO | 2013190153 A1 | 12/2013 |

OTHER PUBLICATIONS

EPO, Supplemental European Search Report dated Apr. 3, 2019.

*Primary Examiner* — Milton Nelson, Jr.
(74) *Attorney, Agent, or Firm* — Matthew J. Spark; Stefan J. Kirchanski; Zuber Lawler & Del Duca LLP

(57) ABSTRACT

A mounting arm assembly movable between stowed and deployed configurations, includes a pivot arm pivotally engaging an armrest of a seat; a tilt arm engaging the pivot arm; and a mount engaging the tilt arm for supporting a personal electronic device.

13 Claims, 20 Drawing Sheets

(56) References Cited

U.S. PATENT DOCUMENTS

| | | | | |
|---|---|---|---|---|
| 7,798,072 B2* | 9/2010 | Becker | ................... | B60N 3/002 |
| | | | | 108/42 |
| 7,857,382 B2* | 12/2010 | Vitito | ...................... | A63F 13/08 |
| | | | | 297/188.16 |
| 2002/0163215 A1 | 11/2002 | Emerling et al. | | |
| 2004/0245796 A1* | 12/2004 | Maierholzner | ........... | B60R 7/04 |
| | | | | 296/37.8 |
| 2005/0092793 A1* | 5/2005 | Berggren | ................ | B60R 11/00 |
| | | | | 224/275 |
| 2006/0242671 A1 | 10/2006 | Vitito | | |
| 2015/0048230 A1 | 2/2015 | Satterfield | | |
| 2015/0329209 A1* | 11/2015 | Muirhead | .......... | B64D 11/0015 |
| | | | | 224/275 |

* cited by examiner

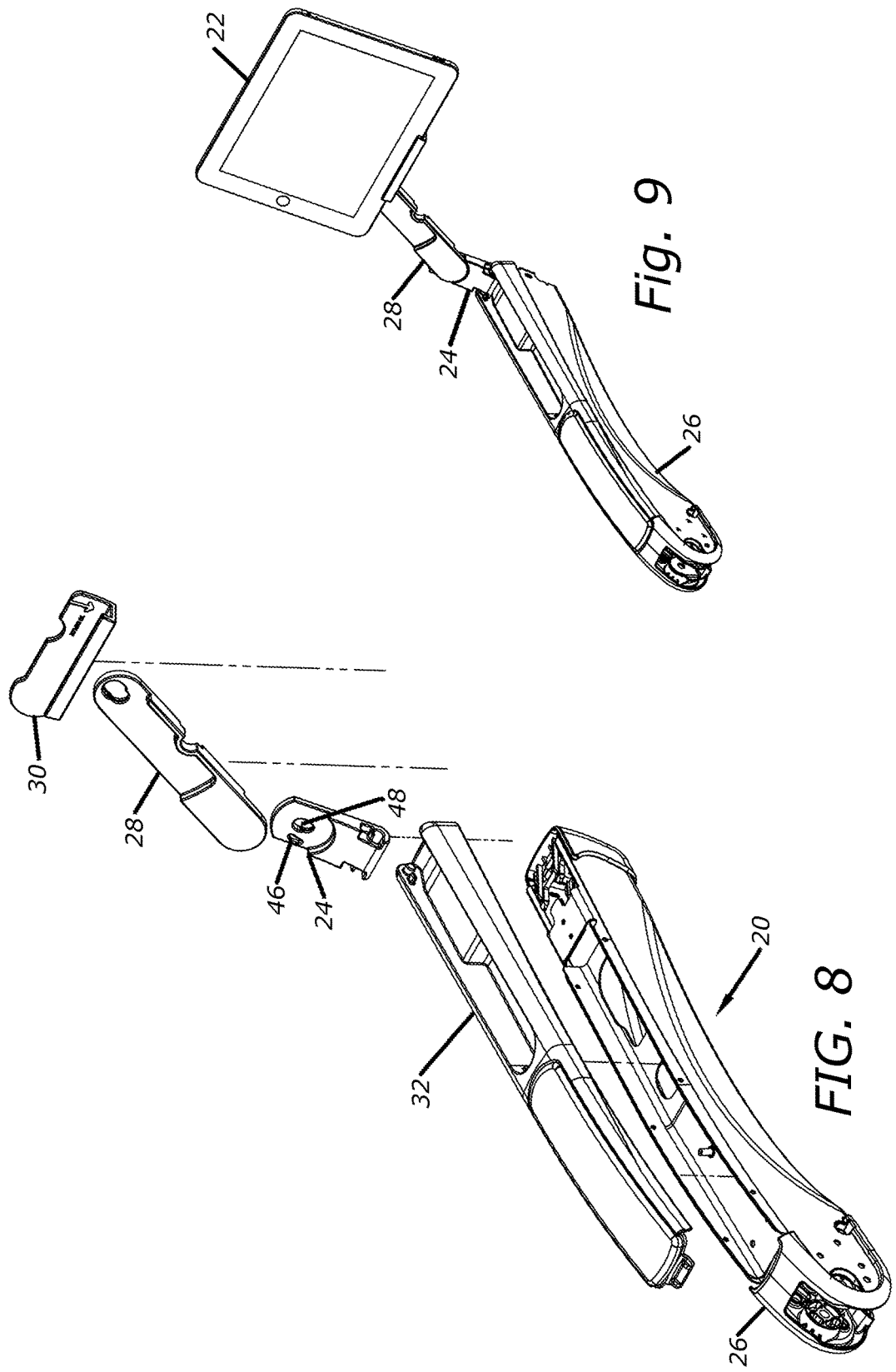

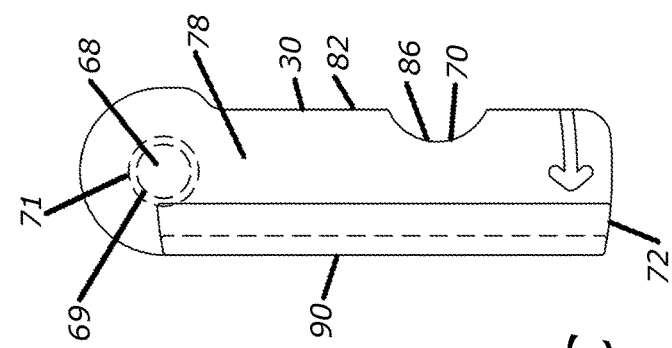
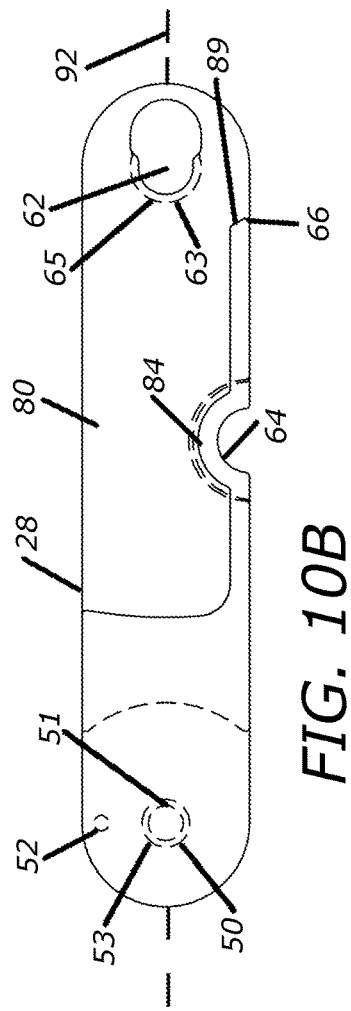
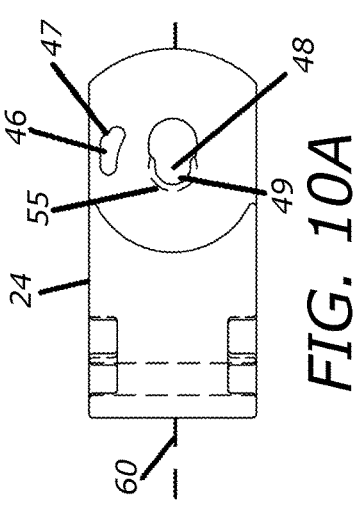

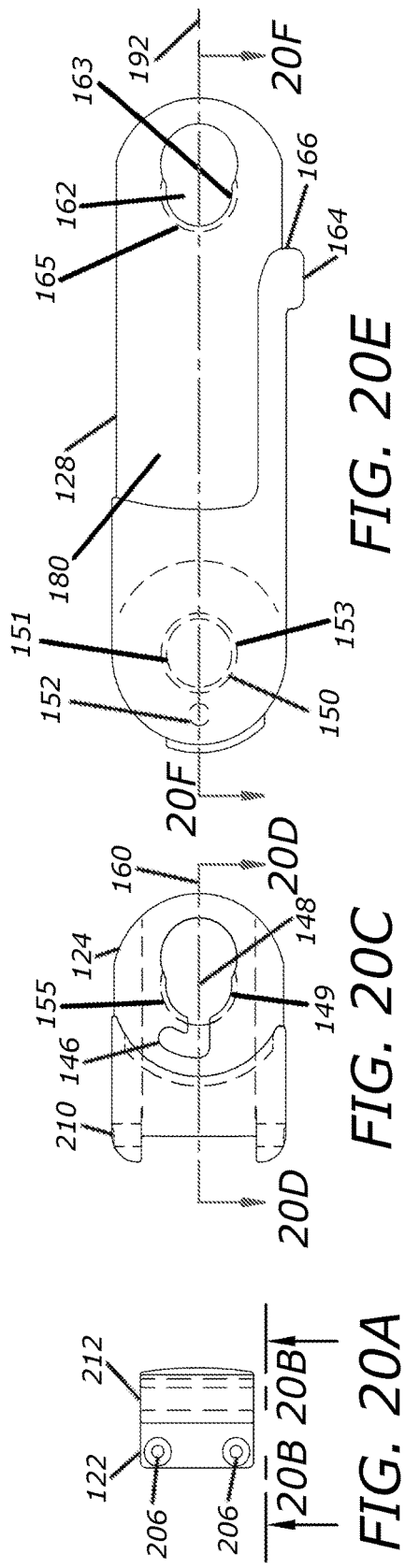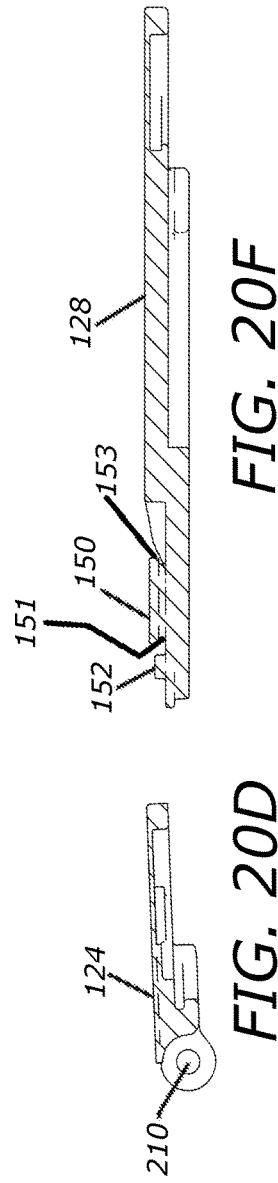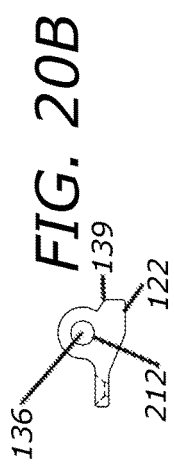

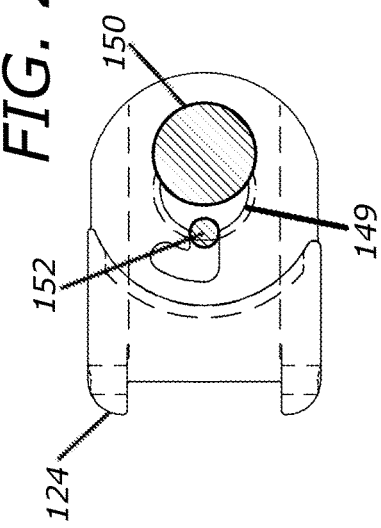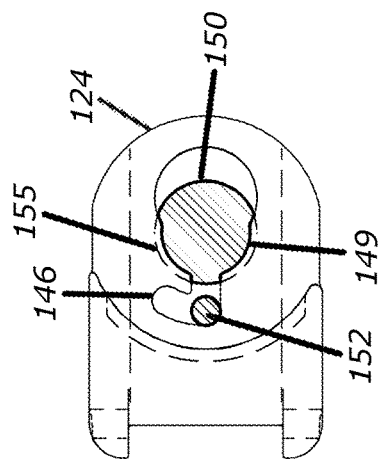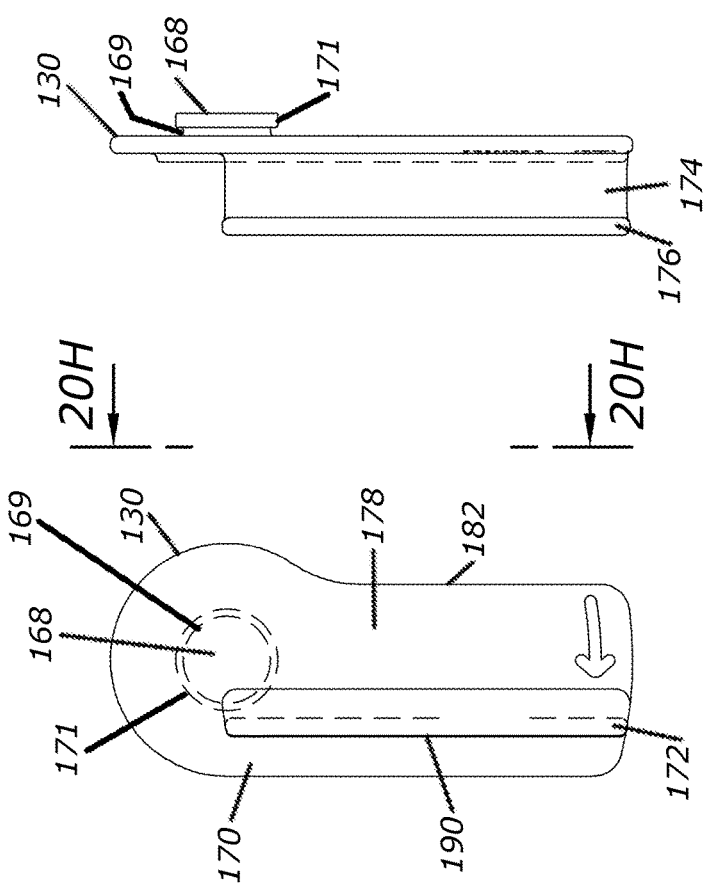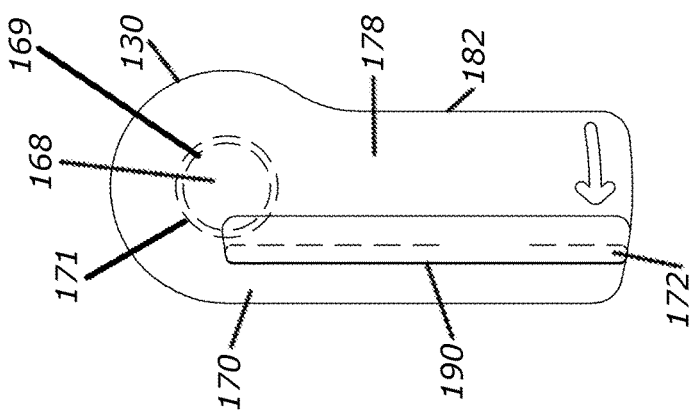

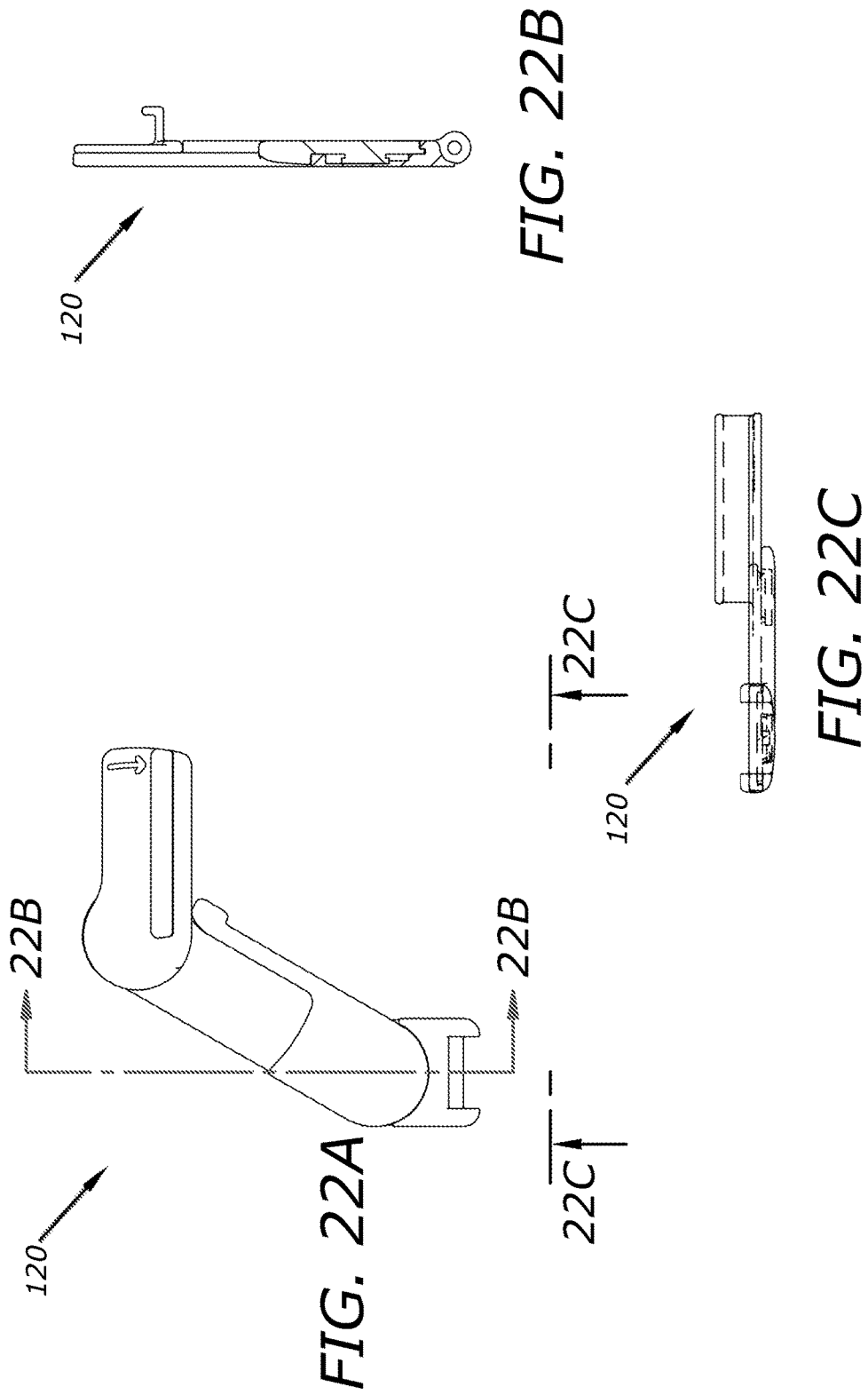

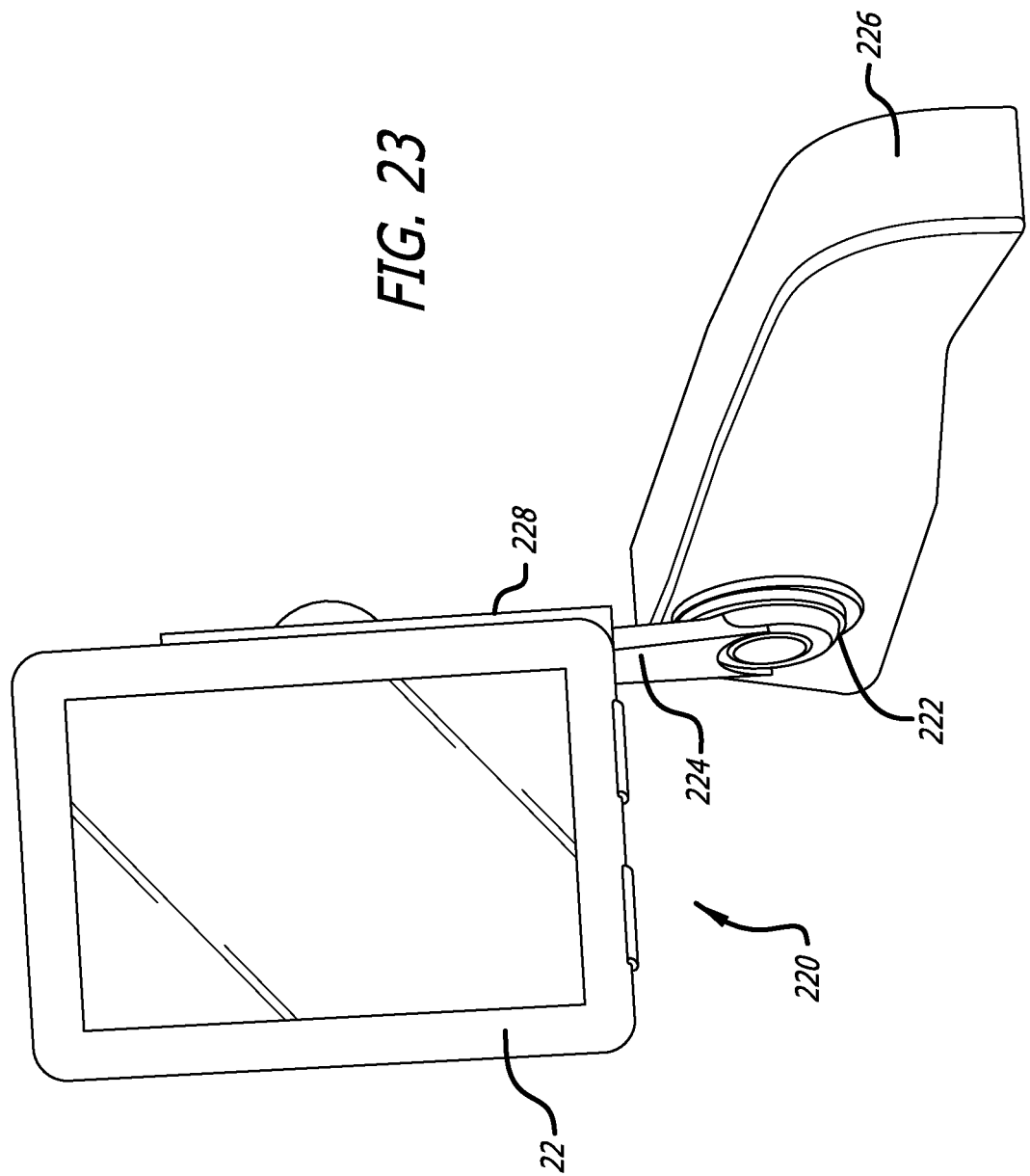

MOUNTING ARM ASSEMBLY

BACKGROUND

The present invention relates generally to support arms. More particularly, the present invention relates to a mounting arm for a personal electronic device (PED).

Commercial airline companies strive to provide improved services for their customers as well as improving passenger comfort and convenience. Today, it is common for both private and commercial passenger aircraft to have an in-flight entertainment (IFE) system. An IFE system generally comprises an entertainment content source, such as a computer server having entertainment and/or information media (e.g., Internet access, movies, music, television shows and/or other entertainment media content) stored in digital format; and a wired or wireless (e.g., WIFI) networking system communicating entertainment media throughout the aircraft in response to passenger communications. On many airlines, it is standard for each passenger to have their own personal video display monitor associated with their chair or seat to provide the passenger with in-flight entertainment and/or information. The video display monitor can include a user interface wherein the passenger may provide touchscreen input to the IFE. However, although an airline may provide at least one video display monitor associated with one or more seats to provide passengers with entertainment and/or information, airlines are also aware that passengers use their own PEDs (e.g., notebook computer, media player, smartphone, tablet-style device, etc.) during a flight. An airline can offer passengers WIFI access in order to connect their PEDs to the IFE. Each passenger seat may include or be associated with a table tray providing a generally horizontal surface upon which the passenger places their PED. These table trays can be deployed from a seatback in front of a user or from an armrest of a passenger seat. However, some PEDs, such as smartphones and tablets, need to be held by the user in a position that allows the display screen on the PED to be seen by the passenger using it. If a PED is placed flat on a tray table with the display screen facing upwards, a passenger may have difficulty seeing the display screen due to the relative angle between the passenger's line of sight and the display screen. Images on the display screen may also be difficult to see due to light reflecting off the surface of the display screen.

Accordingly, there is a need for a mounting arm for holding a PED so that the display of the PED is clearly visible to a user during a flight aboard an aircraft. There is a further need for a mounting arm movable between stowed and deployed positions. There is also a need for a mounting arm that can be stowed within a seat. There is a further need for a mounting arm that can be stowed within a seat armrest. There is an additional need for a mounting arm that can be retro-fitted onto an existing armrest. There is an additional need for a mounting arm that is easier to manufacture, assemble, adjust, and maintain. The present invention satisfies these needs and provides other related advantages.

SUMMARY

The present invention comprises a PED mounting arm (i.e., a mechanical deployment arm) that supports at least one PED (e.g., a smartphone, a tablet device, etc.).

An improved PED mounting arm assembly has been developed for personal electronic device mounting arm that holds a PED so that the display of the PED is visible to a user during a flight. The PED mounting arm assembly is movable between stowed and deployed positions. The PED mounting arm assembly can be stowed within an armrest of a seat. The mounting arm can be retro-fitted onto an existing armrest. The PED mounting arm is easier to manufacture, assemble, adjust, and maintain.

In an illustrative embodiment, a mounting arm assembly movable between stowed and deployed configurations, comprises a pivot arm pivotally engaging an armrest of a seat. A tilt arm engages the pivot arm; and a mount engages the tilt arm for supporting a PED. The mount rotates relative to the tilt arm between stowed and deployed positions, the tilt arm rotates relative to the pivot arm between stowed and deployed positions, and the pivot arm rotates relative to the armrest between stowed and deployed positions.

The pivot arm includes a track, the tilt arm engages the track, and the track limits rotation of the tilt arm relative to the pivot arm. The tilt arm includes a pin engaging the track. The pivot arm limits rotation of the mounting arm assembly between stowed and deployed configurations.

The armrest includes a recess formed therein into which the pivot arm is rotated from an at least partially deployed configuration and from which the pivot arm is rotated from the stowed configuration. The pivot arm pivotally engages an armrest cap of the armrest, wherein the armrest cap includes a recess formed therein into which the pivot arm is rotated from an at least partially deployed configuration and from which the pivot arm is rotated from the stowed configuration.

The mounting arm assembly is stowed generally within a recess of the armrest when the mounting arm assembly is in the stowed configuration, the recess sized and shaped to receive the mounting arm assembly, wherein a side of the mounting arm assembly faces outward from the recess and forms at least a portion of an upper, exterior surface of the armrest generally conforming with a remaining portion of the upper, exterior surface of the armrest.

The tilt arm includes a recess formed therein, generally sized and shaped to receive at least a portion of the mount when the mount is in the stowed position. The tilt arm includes a notch, and the mount includes a notch, wherein the notches of the tilt arm and mount are aligned when the mount is in the stowed position.

The mount includes a generally L-shaped shelf extending away from a generally planar surface of the mount, defining a channel for receiving a portion of the personal electronic device.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts:

FIG. 8 is an exploded perspective view of the mounting arm assembly of FIG. 7;

FIG. 9 is a perspective view of the mounting arm assembly of FIG. 1 in a fully deployed configuration, and holding a personal electronic device;

FIGS. 10A-10C illustrate respective plan views of a pivot arm, tilt arm, and mount of an embodiment of a mounting arm assembly;

FIG. 20A illustrates a plan view of a base of the mounting arm assembly of FIG. 11;

FIG. 20B illustrates a side view of the base of FIG. 20A;

FIG. 20C illustrates a plan view of a pivot arm of the mounting arm assembly of FIG. 11;

FIG. 20D illustrates a side view of the pivot arm of FIG. 20C;

FIG. 20E illustrates a plan view of a tilt arm of the mounting arm assembly of FIG. 11;

FIG. 20F illustrates a side view of the tilt arm of FIG. 20E;

FIG. 20G illustrates a plan view of the mount of the mounting arm assembly of FIG. 11;

FIG. 20H illustrates a side view of the mount of FIG. 20G;

FIGS. 20I-20J illustrates a snap method for engaging the tilt arm with the pivot arm of the mounting arm assembly of FIG. 11;

FIGS. 22A-22C illustrate plan, side section, and side views of the pivot arm, tilt arm, and mount of the mounting arm assembly of FIG. 11;

FIG. 23 is a perspective view of a mounting arm assembly illustrating a further embodiment of the present invention in a fully deployed configuration, where the mounting arm assembly is attached to a side of an armrest;

DETAILED DESCRIPTION

Figure 1:
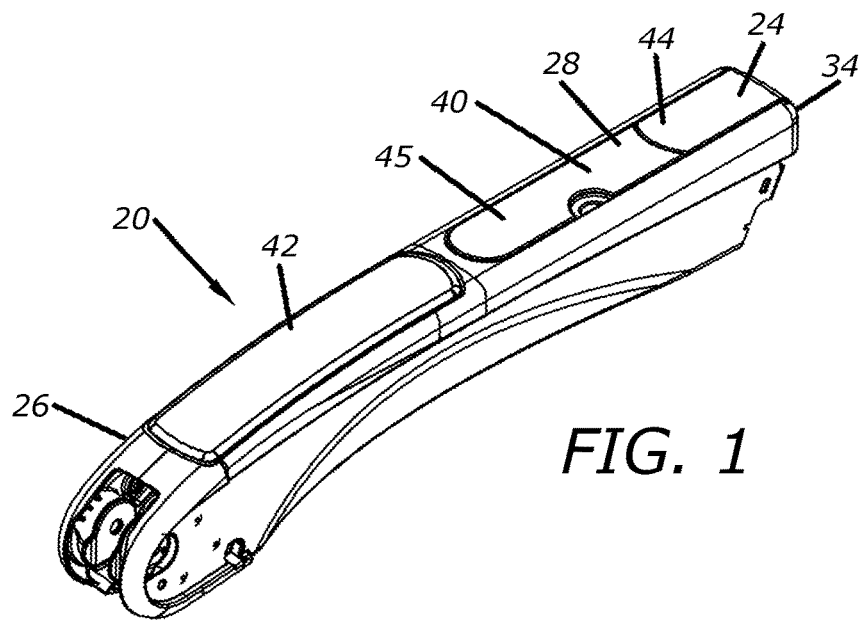
FIG. 1 is a perspective view of a mounting arm assembly illustrating an embodiment of the present invention in a fully stowed configuration.
Figure 2:
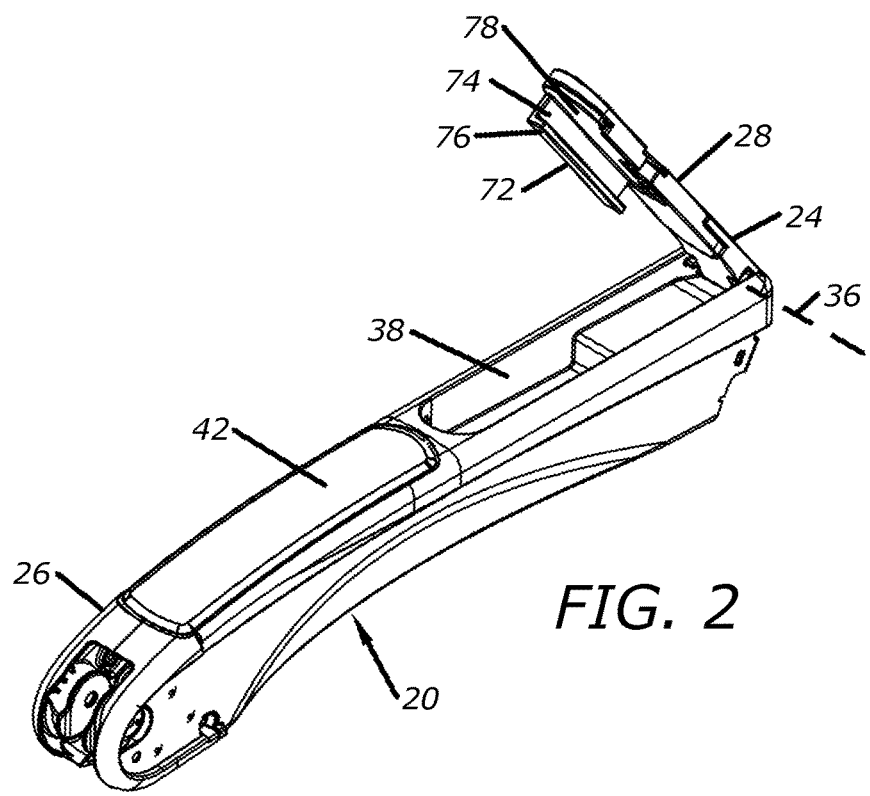
FIG. 2 is a perspective view of the mounting arm assembly of FIG. 1 with a pivot arm in a partially deployed position, and the tilt arm and mount in their respective stowed positions.
Figure 3:
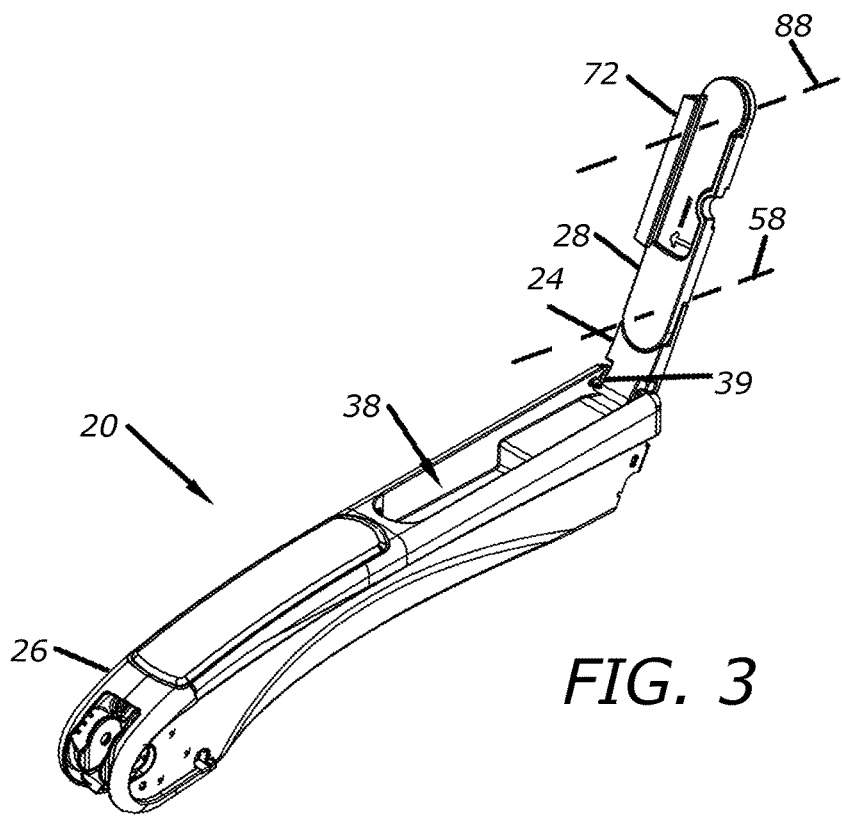
FIG. 3 is a perspective view of the mounting arm assembly of FIG. 1 with the pivot arm in a fully deployed position, and the tilt arm and mount in their respective stowed positions.
Figure 4:
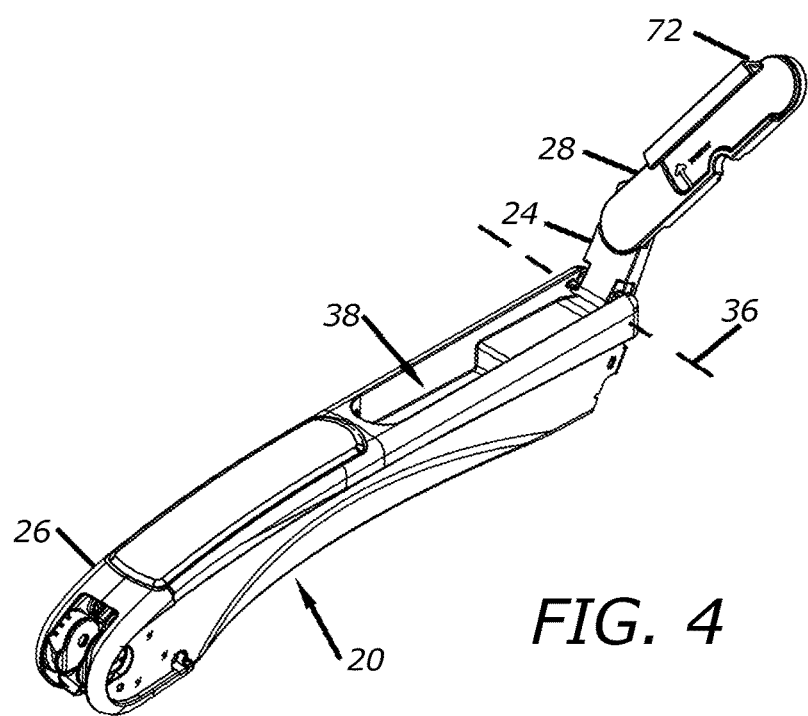
FIG. 4 is a perspective view of the mounting arm assembly of FIG. 1 with the pivot arm in a fully deployed position, the tilt arm in an at least partially deployed position, and mount in its stowed position.
Figure 5:
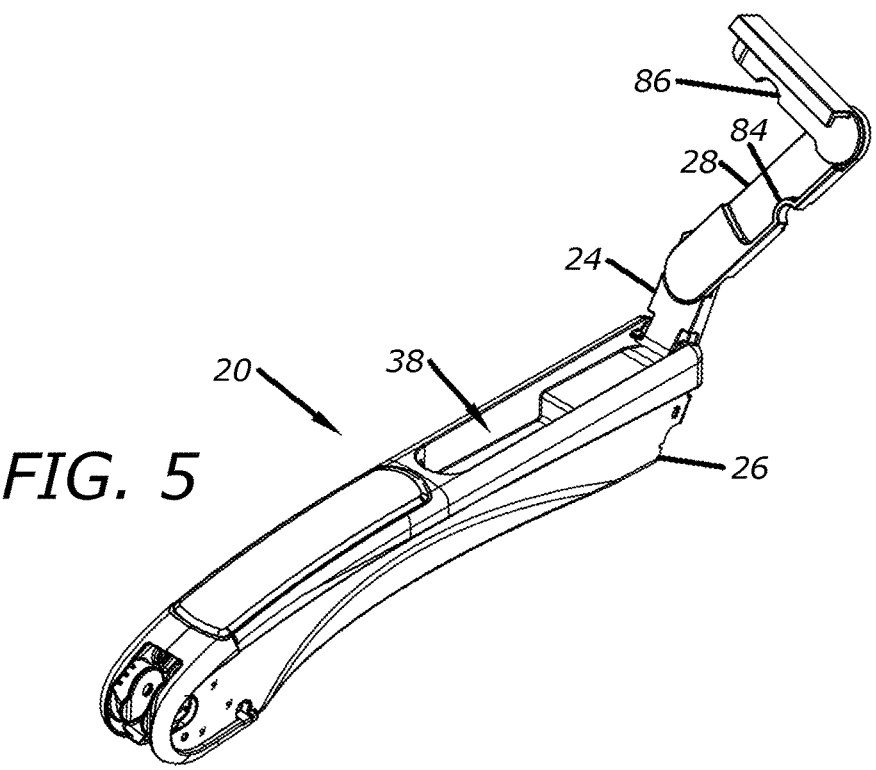
FIG. 5 is a perspective view of the mounting arm assembly of FIG. 1 with the pivot arm in a fully deployed position, the tilt arm in an at least partially deployed position, and mount in an at least partially deployed position.
Figure 6:
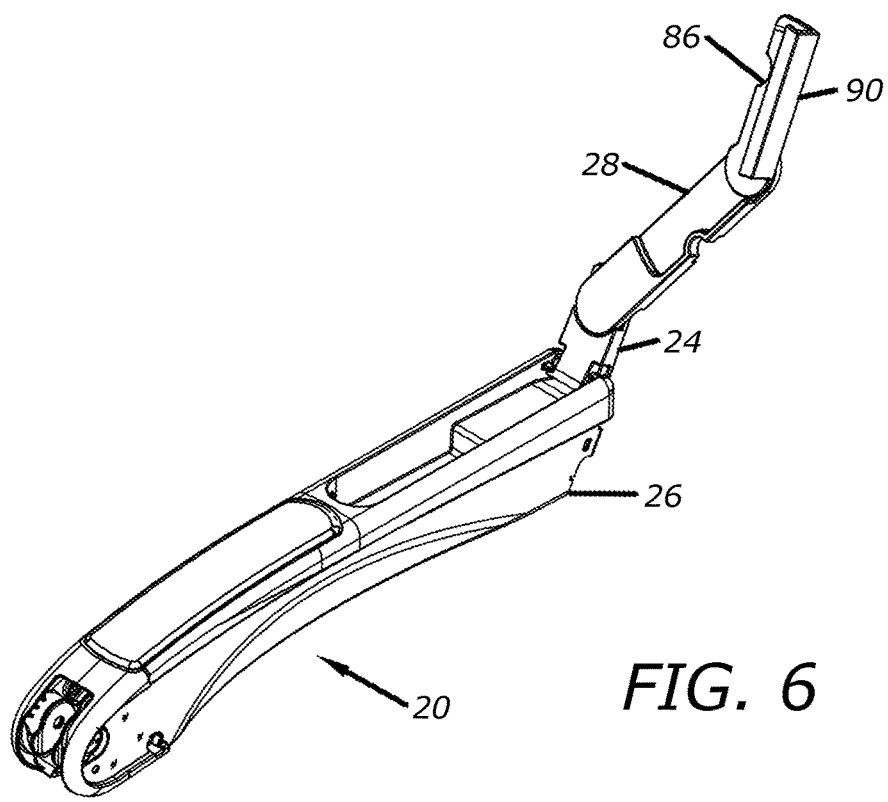
FIG. 6 is a perspective view of the mounting arm assembly of FIG. 1 with the pivot arm in a fully deployed position, the tilt arm in an at least partially deployed position, and mount further rotated along its deployment.
Figure 7:
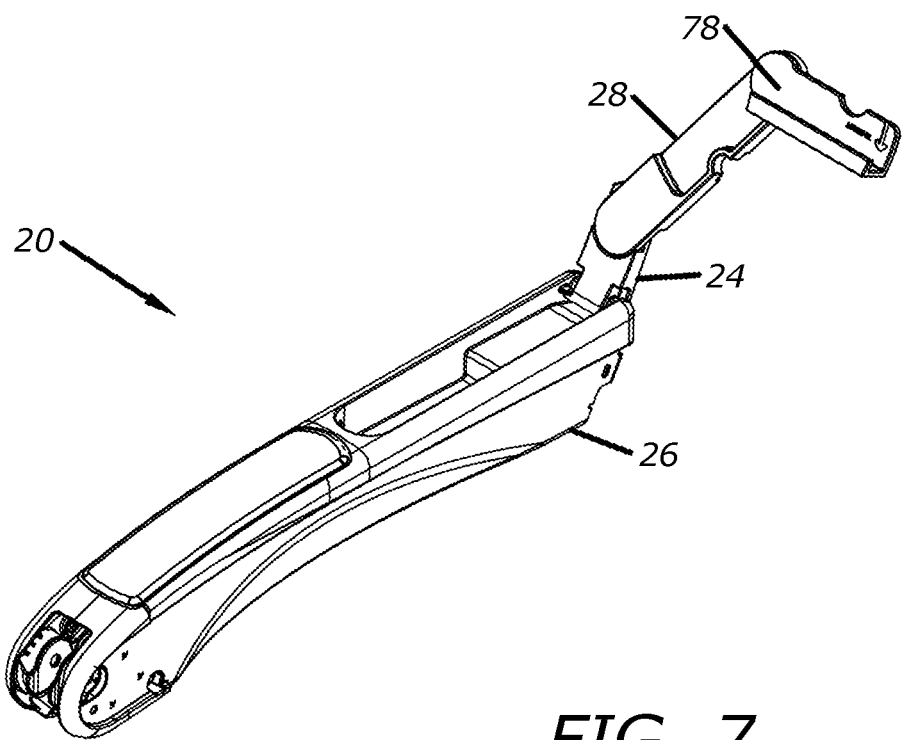
FIG. 7 is a perspective view of the mounting arm assembly of FIG. 1 in a fully deployed configuration with the pivot arm in a fully deployed position, the tilt arm in a fully deployed position, and mount in a fully deployed position.
Figure 11:
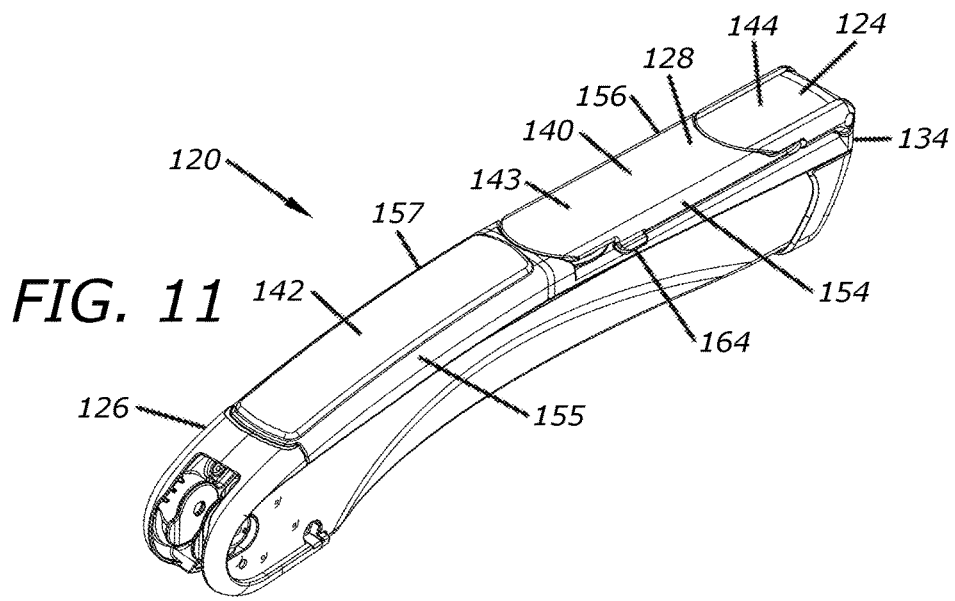
FIG. 11 is a perspective view of a mounting arm assembly illustrating another embodiment of the present invention in a fully stowed configuration.
Figure 12:
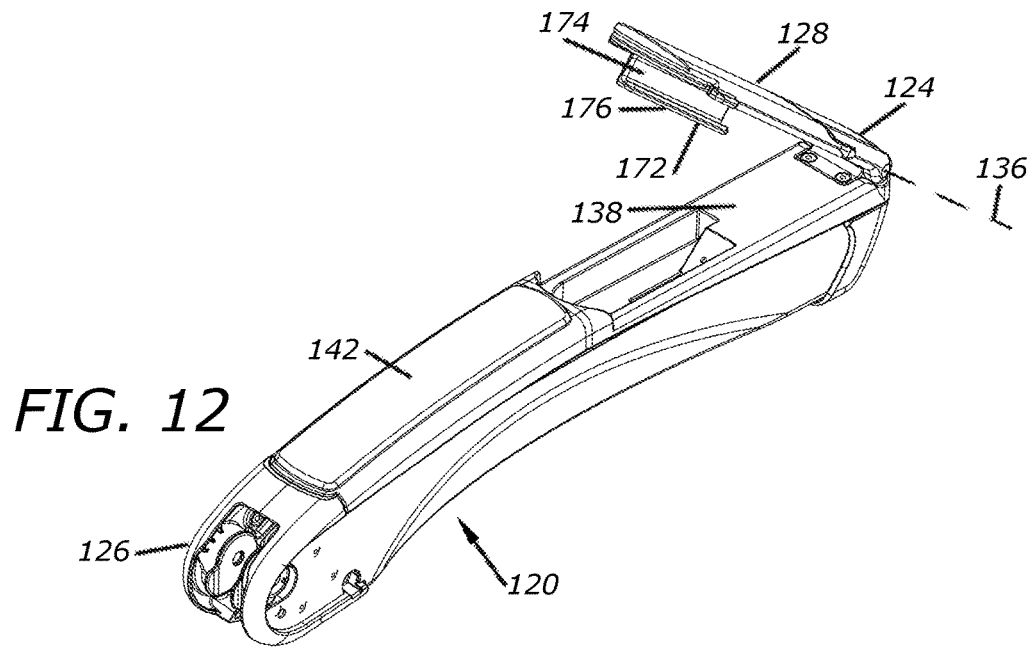
FIG. 12 is a perspective view of the mounting arm assembly of FIG. 11 with a pivot arm in a partially deployed position, and the tilt arm and mount in their respective stowed positions.
Figure 13:
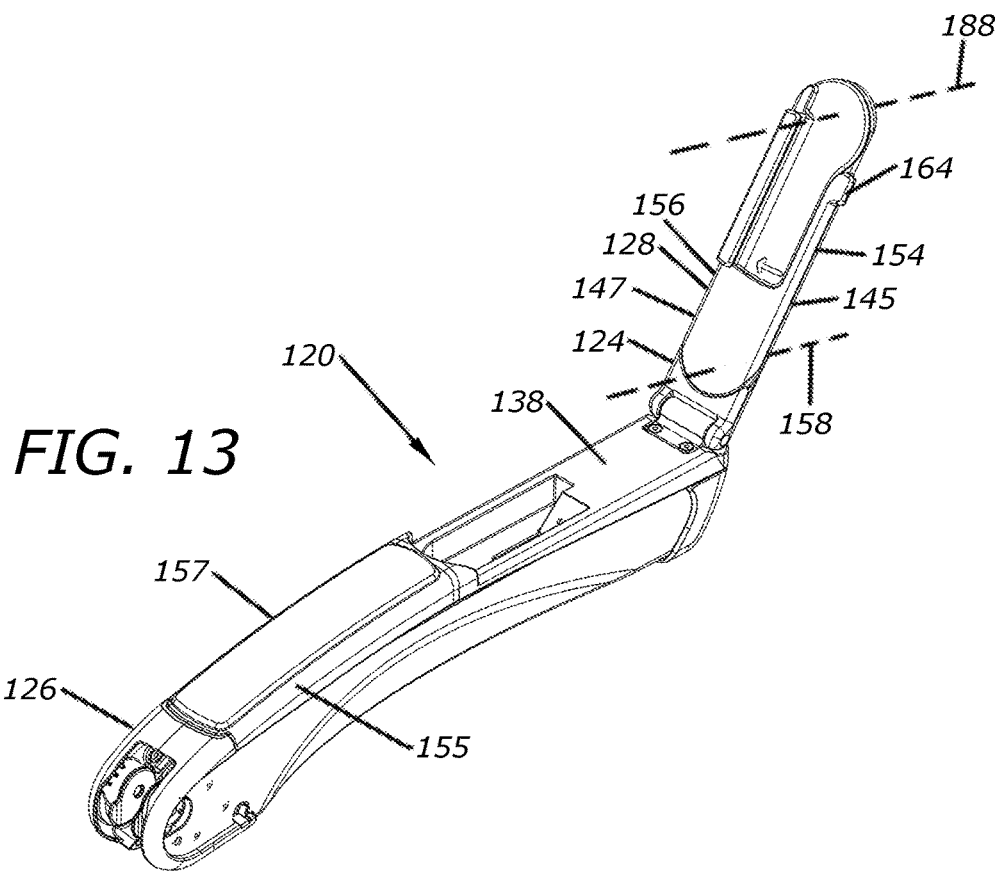
FIG. 13 is a perspective view of the mounting arm assembly of FIG. 11 with the pivot arm in a fully deployed position, and the tilt arm and mount in their respective stowed positions.
Figure 14:
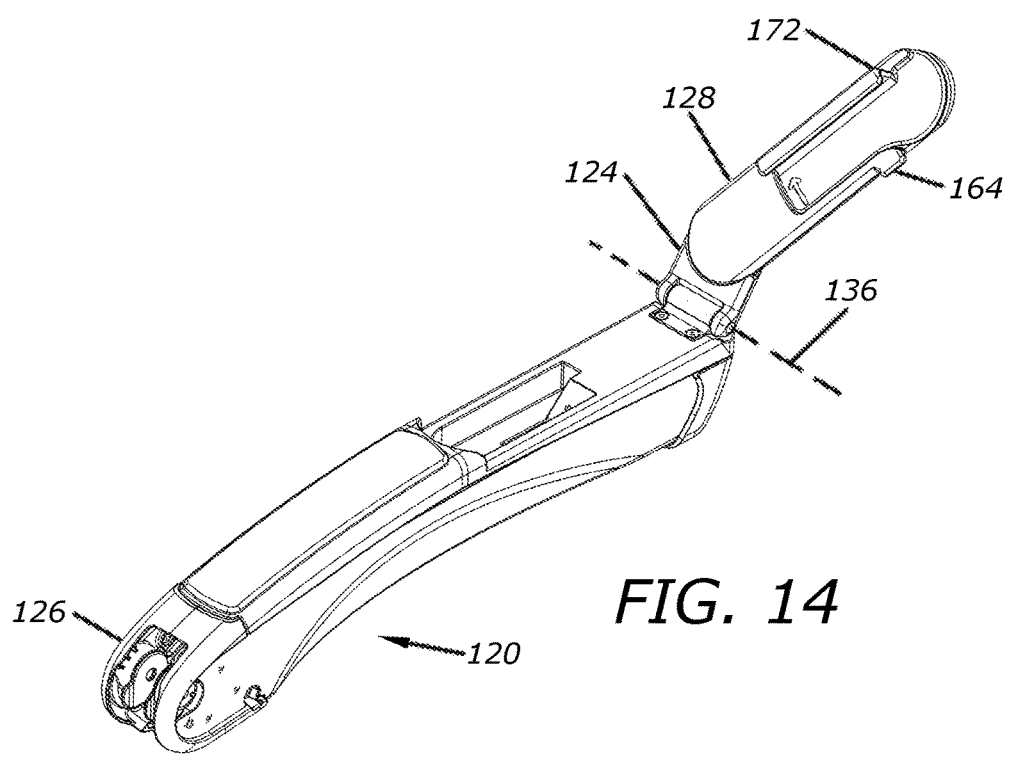
FIG. 14 is a perspective view of the mounting arm assembly of FIG. 11 with the pivot arm in a fully deployed position, the tilt arm in an at least partially deployed position, and mount in a stowed position.
Figure 15:
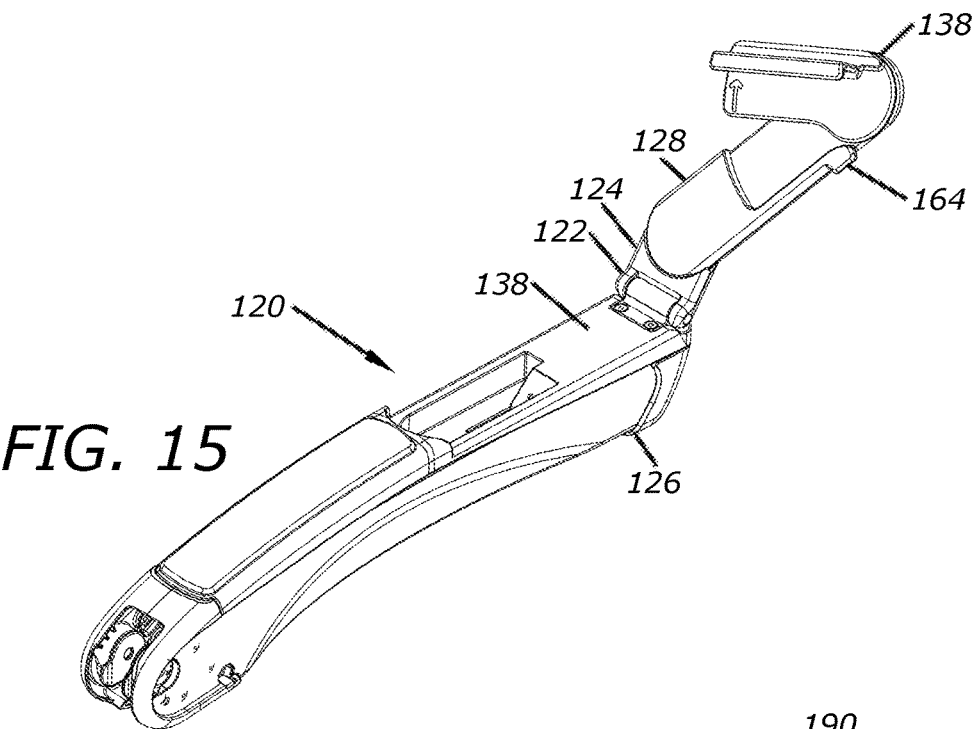
FIG. 15 is a perspective view of the mounting arm assembly of FIG. 11 with the pivot arm in a fully deployed position, the tilt arm in an at least partially deployed position, and mount in an at least partially deployed position.
Figure 16:
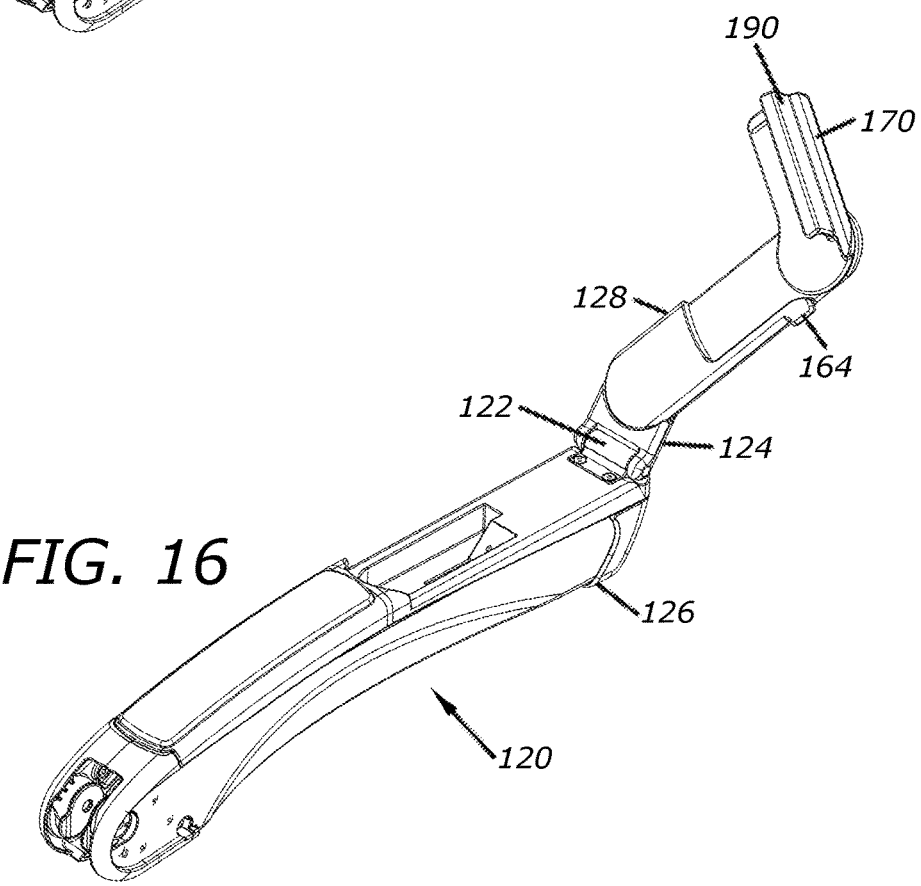
FIG. 16 is a perspective view of the mounting arm assembly of FIG. 11 with the pivot arm in a fully deployed position, the tilt arm in an at least partially deployed position, and mount further rotated along its deployment.
Figure 17:
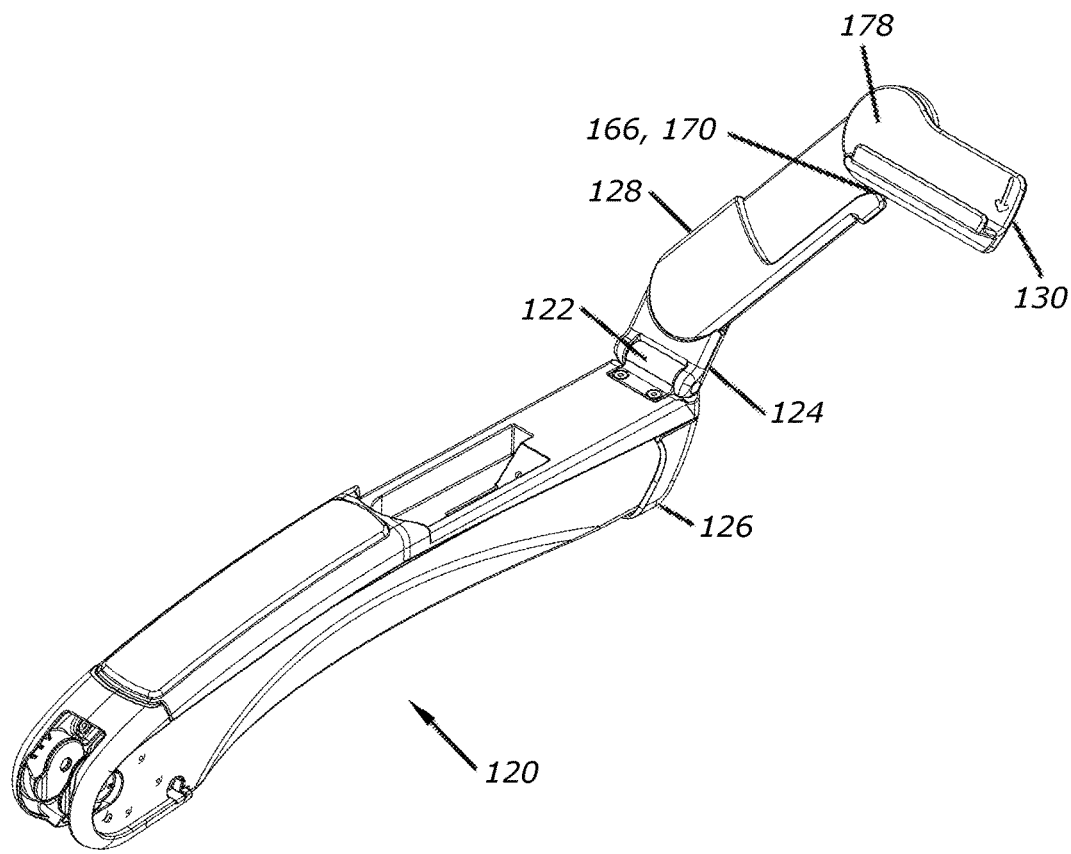
FIG. 17 is a perspective view of the mounting arm assembly of FIG. 11 in a fully deployed configuration with the pivot arm in a fully deployed position, the tilt arm in a fully deployed position, and mount in a fully deployed position.

The following detailed description describes present embodiments with reference to the drawings. In the drawings, reference numbers label elements of present embodiments. These reference numbers are reproduced below in connection with the discussion of the corresponding drawing features.

As shown in FIGS. 1-10C for purposes of illustration, an embodiment of the present invention resides in a mounting arm assembly 20 for a personal electronic device (PED) 22. The PED 22 can be in the form of various types of electronic devices including, but not limited to, a notebook computer, a media player, a smartphone, a tablet-style device, or other portable electronic devices containing music, video, and other content and/or capable of WIFI and/or BLUETOOTH access. The mounting arm assembly 20 is movable between stowed and deployed configurations. The assembly 20 includes a pivot arm 24 pivotally engaging an armrest 26 of a seat (not shown). A tilt arm 28 is pivotally connected to the pivot arm 24, and a mount 30 is pivotally connected to the tilt arm 28. The mount 30 supports the PED 22 when the mounting arm assembly 20 is in its deployed configuration.

The pivot arm 24 is pivotally connected to an armrest cap 32 of the armrest 26. The pivot arm 24 is pivotally connected to the armrest 26 generally at an end 34 of the armrest 26. The pivot arm 24 and the armrest cap 32 cooperate such that the pivot arm 24, along with the rest of the mounting arm assembly 20, rotates relative to the armrest 26 about a pivot axis 36 between stowed and deployed positions of the pivot arm 24 itself. The armrest cap 32 is removably attachable to the armrest 26 in a variety of conventional ways that include, without limitation, mechanical fasteners (e.g., nuts and bolts, screws, snap-detent fit, etc.), chemical fasteners (e.g., glue) and the like, either alone or in combination. For example, when retro-fitting an existing passenger seat on an aircraft, instead of replacing an entire armrest to allow for PEDs, only the armcap needs to be replaced, and this makes it easier to service and/or replace a mounting arm assembly. A USB port could be installed in the closeout cap to allow for charging of a PED while in use, with the USB port connected to the aircraft's electrical system. The armcap is used on every passenger seat and replacing the entire armrest is more costly than simply replacing the armcap.

Alternatively, the pivot arm 24 may be pivotally connected to a base which may come in various forms including, without limitation, a bracket, housing or the like. The base may comprise multiple components or be of single-piece construction. The base is attachable to a surface (not shown) that may be a surface on a vehicle (e.g., aircraft) bulkhead, an exterior side of a vehicle chair or a side of a console housing or compartment located next to or part of a vehicle passenger seat or chair. The base is attachable to the surface using mechanical fasteners (e.g., screws, nuts and bolts, etc.), chemical fasteners (e.g., glue, adhesive, etc.) or the like. In the alternative, the base (or at least a portion thereof) may be formed of single-piece construction with the surface (e.g., formed as part of a seating console in a passenger aircraft).

The armrest cap 32 includes a recess 38 formed therein. The pivot arm 24 (with the tilt arm 28 in its stowed position relative to the pivot arm 24) is rotated about the pivot axis 36 and moved into the recess 38 when the mounting arm assembly 20 is moved from an at least partially deployed configuration into the stowed configuration. Similarly, the pivot arm 24 (with the tilt arm 28 in its stowed position relative to the pivot arm 24) is rotated about the pivot axis 36 and moved outward from the recess 38 when the mounting arm assembly 20 is moved from the stowed configuration to an at least partially deployed configuration. A flange 39 extending from a side of the recess 38 acts as a hard stop to the rotation of the pivot arm 24, when the flange 39 engages a lower portion of the pivot arm 24 near where the pivot arm 24 pivotally engages the armrest cap 32, and therefore limits rotation of the pivot arm 24 as the pivot arm 24 moves from its stowed position to its deployed position. This, in turn, limits rotation of the overall mounting arm assembly 20 about the pivot axis 36 as the assembly 20 moves from its stowed configuration to its deployed configuration. In the alternative, an armrest does not have a separate armrest cap 32, and a recess is formed on a top surface thereof from which the mounting arm assembly 20 may be deployed and into which the mounting arm assembly 20 may be stowed.

The mounting arm assembly 20 is stowed generally within the recess 38 of the armrest 26 when the mounting arm assembly 20 is in the stowed configuration. The recess 38 is sized and shaped to receive the mounting arm assembly 20. A side 40 of the mounting arm assembly 20 faces outward from the recess 38 and forms at least a portion of an upper, exterior surface 42 of the armrest 26 generally conforming with a remaining portion of the upper, exterior surface 42 of the armrest 26. The side 40 of the mounting arm assembly 20 is comprised of a side 44 of the pivot arm 24 and a side 45 of the tilt arm 28.

The pivot arm 24 includes a track 46 and a rotation receptacle 48. The track 46 may come in various forms including, but not limited to, a slot extending through the body of the pivot arm 24, a channel recessed a depth within the body of the pivot arm 24, or the like. The length and shape (e.g., generally arcuate) of the track 46 controls the amount by which the tilt arm 28 can rotate relative to the pivot arm 24 between the stowed and deployed positions of the tilt arm 28. The tilt arm 28 includes a rotation pin 50 and a pin 52 that engage, respectively, the rotation receptacle 48 and the track 46. The rotation pin 50 snaps into and engages the rotation receptacle 48. When the rotation pin 50 engages the rotation receptacle 48, the pin 52 slides into and engages the track 46, such that the track 46 limits rotation of the tilt arm 28 relative to the pivot arm 24. The track 46 includes a notch 47 to aid in receiving the pin 52 in order to snap engage the track 46. The receptacle 48 includes a notch 49 to aid in the pin 50 engaging the receptacle 48 with a neck 51 of the pin 50 engaging the notch 49 and an upper, outwardly extending circular flange 53 of the pin 50 engaging a retaining lip 55 of the receptacle 48.

The tilt arm 28 rotates about a tilt axis 58 (running generally through a center of the rotation pin 50 engaged to the rotation receptacle 48) as the tilt arm 28 is moved between its stowed and deployed positions. The length and shape of the track 46 limits rotation of the tilt arm 28 about the tilt axis 58 between about zero (0) degrees from a longitudinal axis 60 of the pivot arm 24 in the tilt arm's 28 stowed position to about thirty (30) degrees from the longitudinal axis 60 of the pivot arm 24 in the tilt arm's 28 deployed position. The rotation of the tilt arm 28 relative to the pivot arm 24 is limited in order to allow the PED 22 to be more centered and, in the situation where the mounting arm assembly 20 is deployed from the armrest 26 of an airline seat, positioned above a tray table associated with the airline seat. There is sufficient frictional engagement between the tilt arm 28 and the pivot arm 24 such that the weight of the PED 22 does not move the tilt arm 28 relative to the pivot arm 24.

The tilt arm 28 includes a rotation receptacle 62, an indent or notch 64, and a stop 66. The notch 64 and position of the stop 66 define the amount by which the mount 30 can rotate relative to the tilt arm 28 between the stowed and deployed positions of the mount 30. The mount 30 includes a rotation pin 68 and a notch 70 that engage, respectively, the rotation receptacle 62 and the notch 64. The rotation pin 68 snaps into and engages the rotation receptacle 62. The rotation receptacle 62 includes a notch 63 to aid in the pin 68 snap engaging the receptacle 62 with a neck 69 of the pin 68 engaging the notch 63 and an upper, outwardly extending circular flange 71 of the pin 68 engaging a retaining lip 65 of the receptacle 62. The mount 30 includes a holder 72 for receiving a portion of the PED 22. The holder 72 may be sized and shaped so as to frictionally engage the PED 22 so as to hold the PED 22 in place. The holder 72 includes a base 74, where the base 74, a first wall 76, and an opposite second wall 78 spaced apart by a space from the first wall 76 define a generally L-shaped shelf extending away from a generally planar surface of the mount 30) that in turn defines an elongated channel, slot or groove of the holder 72 such that a PED 22 can be positioned on the base 74, between the first and second walls 76, 78. The first wall 76 extends away from the base 74. The second wall 78 is the generally planar surface of the mount 30. In an embodiment, the channel may be lined with a material, such as silicon, foam, rubber or the like in order to provide a shock-absorbing, resilient surface between the PED 22 and the mount 30 when the PED 22 is positioned in the holder 72, that also frictionally engages the PED 22 to hold the PED 22 in engagement with the mount 30 when positioned on the mount 30.

The tilt arm 28 includes a recess 80 formed therein, generally sized and shaped to receive the mount 30 such that a main body portion 82 of the mount 30 is nestled within the recess 80 when the mount 30 is rotated into its stowed position. The notches 64, 70 of the tilt arm 28 and mount 30 are generally aligned and co-axial when the mount 30 is in its stowed position. A curved portion of a sidewall 84 of the recess 80 (e.g., a curved portion of the sidewall 80 generally following the general contour of the notch 64) engages a curved side 86 of notch 70 when the mount 30 is in its stowed position. In the instant example, the notches 64, 70 are shown as being arcuate in shape but the notches 64, 70 could be a variety of shapes including, but not limited to generally V-shaped, generally C-shaped, generally U-shaped, etc.

The mount 30 rotates about a mount axis 88 (running generally through a center of the rotation pin 68 engaged to the rotation receptacle 62) as the mount 30 is moved between its stowed and deployed positions. The mount 30 may include indicia in the form of an arrow (see, e.g., FIGS. 4 and 10C) that may be accompanied by indicia in the form of words (e.g., "TO DEPLOY" or "OPEN") that indicate the direction the mount 30 should be rotated about the mount axis 88 towards a deployed position. The position of the stop 66 limits rotation of the tilt arm 28 about the mount axis 88 in the direction of deployment when an angled surface 89 of the stop 66 engages a bottom side 90 of the mount 30. The mount 30 is about sixty (60) degrees from a longitudinal axis 92 of the tilt arm 28 when the mount 30 is rotated into the mount's 30 fully deployed position (about ninety (90) degrees from the longitudinal axis 60 of the pivot arm 24 in the mount's 30 fully deployed position). The total rotation of the mount 30 from its stowed position to its deployed position is about two hundred forty (240) degrees about the mount axis 88. The rotation of the mount 30 relative to the tilt arm 28 is limited in order to allow the PED 22 to be more centered and, in the situation where the mounting arm assembly 20 is deployed from the armrest 26 of an airline seat, positioned above a tray table associated with the airline seat. There is sufficient frictional engagement between the mount 30 and the tilt arm 28 such that the weight of the PED 22 does not move the mount 30 relative to the tilt arm 28. In its deployed position, the mount 30 extends outwardly away from the tilt arm 28 and is oriented generally perpendicular to the pivot arm 24. In an alternative, the mount 30 is rotatable about the longitudinal axis of the mount 30 such that the PED 22 can be tilted up to about fifteen degrees towards or away from the user (about a thirty degree range of rotation).

In the alternative, the pivot arm 24 is constructed so that the pivot arm 24 can rotate about its longitudinal axis, the tilt arm 28 is constructed so that the tilt arm 28 can rotate about its longitudinal axis, and the mount 30 is constructed so that the mount 30 can rotate about its longitudinal axis, with there being sufficient rotational resistance to the weight of a PED 22 so as to maintain the various components of the mount arm assembly 20 in position when the mount arm assembly 20 holds a PED 22.

Alternatively, the recess 38 also includes an aperture (not shown) though which a user/passenger can access a USB port or the like in order to re-charge a battery of the PED or connect the PED to the IFE system via an adapter cord/cable having a connector compatible with and engaging the PED on one end and a connector compatible with and engaging the USB port in the recess 38 on the other end. In a further alternative, an adapter cord/cable connected to a wire harness (e.g., a wire harness connected to the IFE system or the like, where the wire harness can be in the form of a bundle of electrical wires with specialized connectors at each end) can be extended from the aperture in the recess 38 and operationally connected to the PED, with the adapter cord/cable automatically retracting to the aperture in the recess 38 when disengaged from the PED.

In a further alternative, the wire harness could be routed through or along the exterior of the mounting arm assembly. The wire harness could have a connector at one end extending through an aperture on the shelf of the mount where the connector electro-mechanically engages a PED positioned on the mount. The wire harness could be routed through or along the mount, tilt arm, and pivot into the armrest where the wire harness connects to the sources of IFE content and power. In another alternative, PEDs containing music, video, and other content, could be similarly attached, and in some cases, could be integrated into the IFE system in such a way as to permit cooperative use of a video monitor integrated into an airline seat (e.g., integrated into the seatback of an airline seat facing a passenger or attached to a video arm deployable from a seat console, etc.) and related controls (i.e., effectively running the stored music and videos through the embedded IFE system).

Upon full deployment, the mounting arm assembly 20 must firmly hold the PED 22 in place while the aircraft (or other vehicle) moves and/or vibrates. Therefore, to prevent unwanted upward or downward motion of the mounting arm assembly 20, there is sufficient frictional engagement between the pivot arm 24, tilt arm 28, and mount 30 to counteract the weight of the mounting arm assembly 20 and PED 22, plus any additional amount of grip needed to account for turbulence in flight and/or other sources of vibration. The frictional engagement of the components of the mounting arm assembly 20 must not only support the PED 22, holding the PED 22 firmly in place, but also allow the mounting arm assembly 20 to be easily adjusted manually by the passenger and it must maintain that adjustment once made.

In use, the deployment stages required to bring the mounting arm assembly 20 to a proper viewing position of a PED 22 held by the assembly 20 are as follows: stowed position, initial deployment, secondary deployment, and final deployment. In the stowed position, the mounting arm assembly 20 is contained in the recess 38 of the armrest 26 (for purposes of illustration only, the armrest 26 is the passenger's left armrest, and the following steps can be adopted and modified for the situation where the mounting arm assembly 20 is stowed within a passenger's right armrest, with the goal that the assembly 20 be deployed generally in front of the passenger). Alternatively, the assembly 20 may be stowed within a recess of a space within a housing or console, in a space between passenger chairs, or in a space between a passenger chair and a bulkhead, and so on. In any event, in the stowed position, the mounting arm assembly 20 is out of sight of the passenger except for the side 40 of the mounting arm assembly 20 facing outwardly from the recess 38 and forming at least a portion of the upper, exterior surface 42 of the armrest 26. In the initial deployment stage, the mounting arm assembly 20 is pivoted vertically from within the recess 38 in which it is stowed. This initial deployment is accomplished by the user inserting one or more fingers into the recess 38 through the respective, aligned notches 64, 70 of the tilt arm 28 and mount 30 (which are in their stowed positions) and allows the user to then manually pull the assembly 20 further pivotally upwards about the pivot axis 36 so that the pivot arm 24 is fully pivotally extended from its stowed position. The flange 39 extending from the side of the recess 38 acts as a hard stop to the rotation of the pivot arm 24, when the flange 39 engages a portion of the pivot arm 24 shaped and positioned to engage the flange 39, and thereby limits outward rotation of the pivot arm 24. The pivot arm 24 rotates about one hundred twenty five (125) degrees between its fully stowed and fully deployed positions.

In the alternative, the mounting arm assembly 20 includes a latch mechanism used to hold the assembly 20 in a stowed configuration and release the assembly 20 from the stowed position when a user desires to move the assembly 20 into a deployed configuration. The user could actuate the latch mechanism either by pushing a mechanical button associated with the latch mechanism operationally connected to the assembly 20, or by pressing against the side 40 of the assembly 20, activating a release mechanism, or by any other means that will disengage the latch holding the assembly 20 in place in the stowed position. Pushing the button or the side 40 releases the latch mechanism and allows the user to then manually pull the assembly 20 further pivotally upwards about the pivot axis 36 so that the pivot arm 24 is fully pivotally extended from the stowed position.

In secondary deployment, the passenger rotates the tilt arm 28 clockwise about the tilt axis 58. As discussed above, the length and shape of the track 46 limits rotation of the tilt arm 28 about the tilt axis 58 between about zero (0) degrees from a longitudinal axis 60 of the pivot arm 24 in the tilt arm's 28 stowed position to about thirty (30) degrees from the longitudinal axis 60 of the pivot arm 24 in the tilt arm's 28 deployed position. This allows any PED 22 eventually mounted on the mount 30 to be more centered in front of the passenger and brings the PED 22 into a viewing plane of the passenger. This also positions the PED 22 above a tray table, if any, in front of the passenger.

In the final deployment stage, the passenger rotates the mount 30 clockwise about the mount axis 84 until the angled surface 89 of the stop 66 engages the bottom side 90 of the mount 30. A PED 22 can be placed within the holder 92. In general, the mounting arm assembly 20 may be stowed by adapting the deployment steps, described above, to be executed in reverse order.

As shown in FIGS. 11-22C for purposes of illustration, another embodiment of the present invention resides in a mounting arm assembly 120, similar to mounting arm assembly 20 described above, for a personal electronic device (PED) 22. As described above, the PED 22 can be in the form of various types of electronic devices including, but not limited to, a notebook computer, a media player, a smartphone, a tablet-style device, or other portable electronic devices containing music, video, and other content and/or capable of WIFI and/or BLUETOOTH access. The mounting arm assembly 120 is movable between stowed and deployed configurations. The assembly 120 includes a base 122, a pivot arm 124 pivotally engaging the base 122. The base 122 is removably connected to an armrest 126 of a seat (not shown) such that the base 122 secures the mounting arm assembly 120 to the armrest 126. A tilt arm 128 is pivotally connected to the pivot arm 124, and a mount 130 is pivotally connected to the tilt arm 128. The mount 130 supports the PED 22 when the mounting arm assembly 120 is in its deployed configuration.

The pivot arm 124 is pivotally connected to the base 122, which is itself removably connected to an armrest cap 132 of the armrest 126 such that the base 122 is stationary relative to the armrest cap 132. The base 122 is removably connected to the armrest 126 generally at an end 134 of the armrest 126. The pivot arm 124 and the base 122 cooperate such that the pivot arm 124, along with the rest of the mounting arm assembly 120, rotates relative to the base 122/armrest 126 about a pivot axis 136 between stowed and deployed positions of the pivot arm 124 itself. The armrest cap 132 is removably attachable to the armrest 126 in a variety of conventional ways that include, without limitation, mechanical fasteners (e.g., nuts and bolts, screws, snap-detent fit, etc.), chemical fasteners (e.g., glue) and the like, either alone or in combination. For example, when retro-fitting an existing passenger seat on an aircraft, instead of replacing an entire armrest to allow for PEDs, only the armcap needs to be replaced, and this makes it easier to service and/or replace a mounting arm assembly. A USB port could be installed in the closeout cap to allow for charging of a PED while in use, with the USB port connected to the aircraft's electrical system. The armcap is used on every passenger seat and replacing the entire armrest is more costly than simply replacing the armcap.

Figure 18:
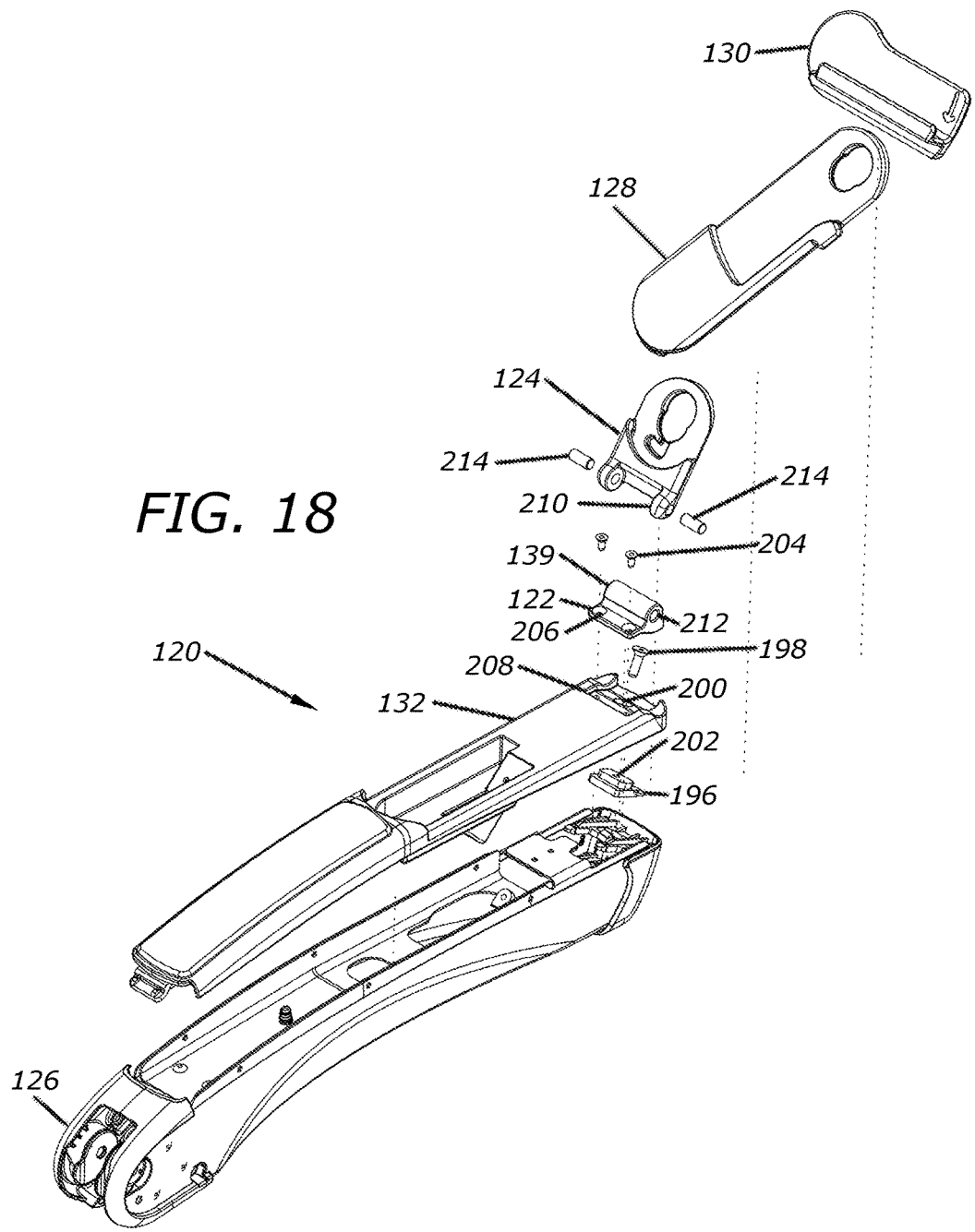
FIG. 18 is an exploded perspective view of the mounting arm assembly of FIG. 17.
Figure 19:
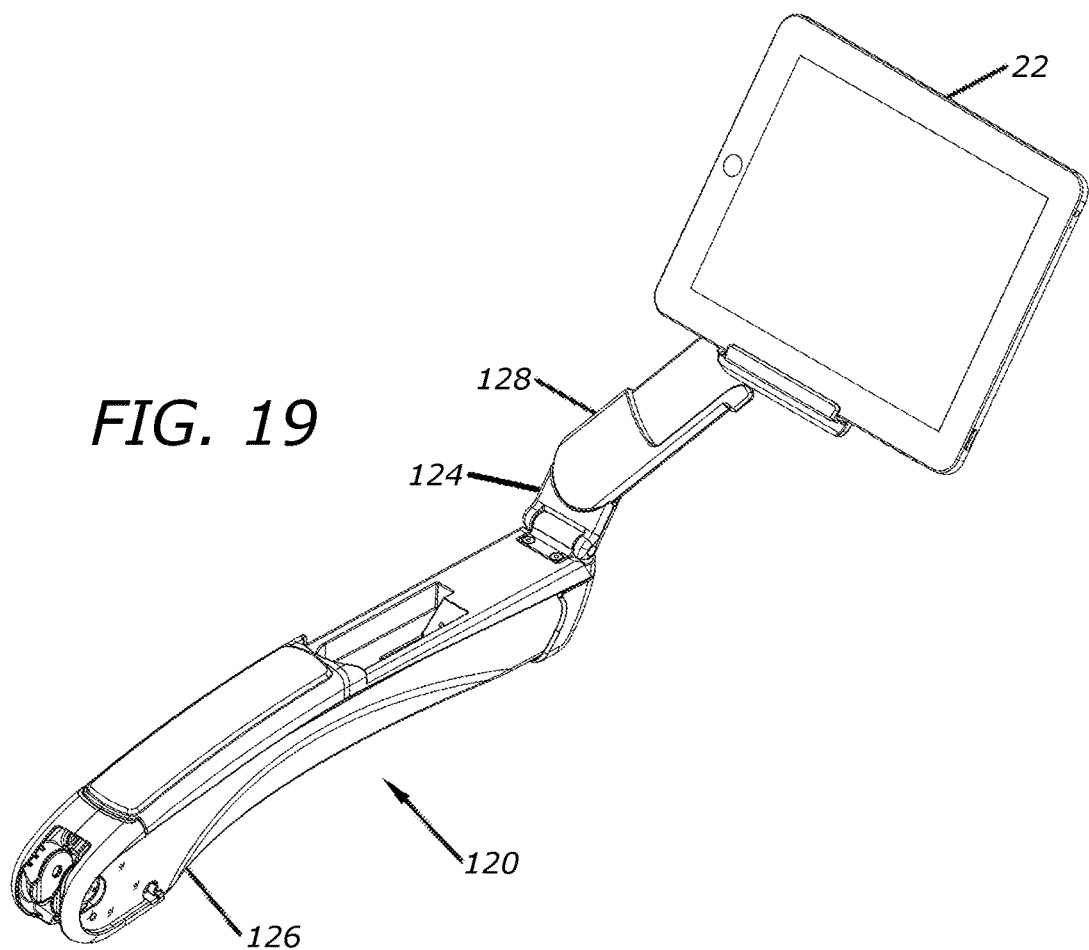
FIG. 19 is a perspective view of the mounting arm assembly of FIG. 11 in a fully deployed configuration, and holding a personal electronic device.
Figure 21A:
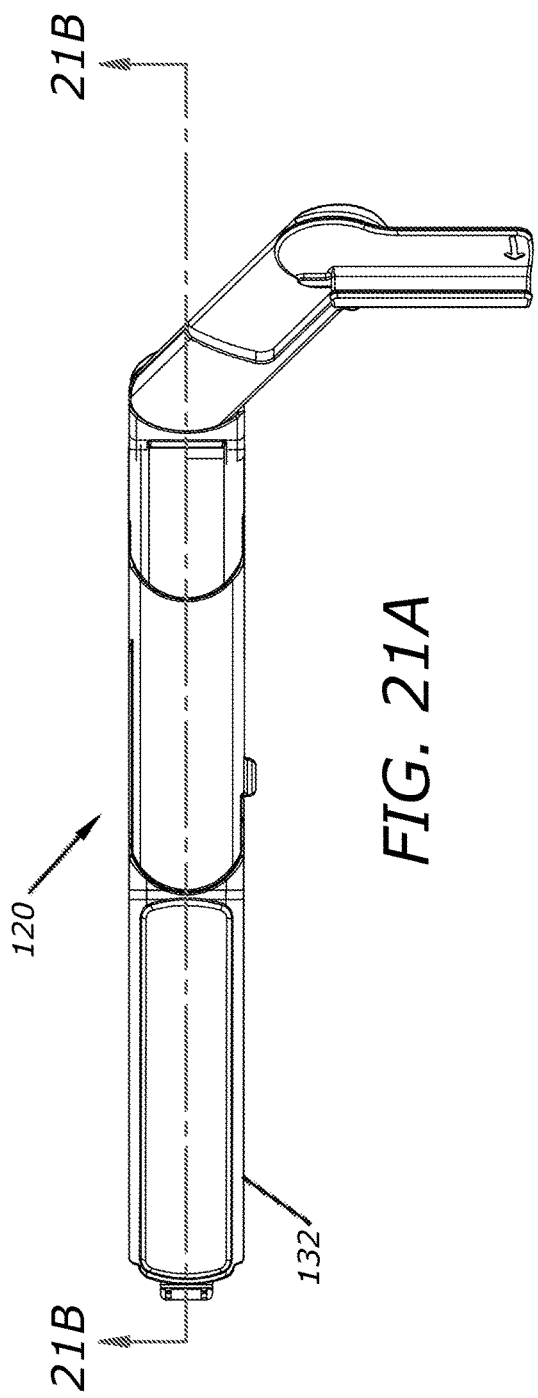
FIGS. 21A-21B illustrate plan and side section views of the mounting arm assembly of FIG. 11 deployed from an armrest cap.
Figure 21B:
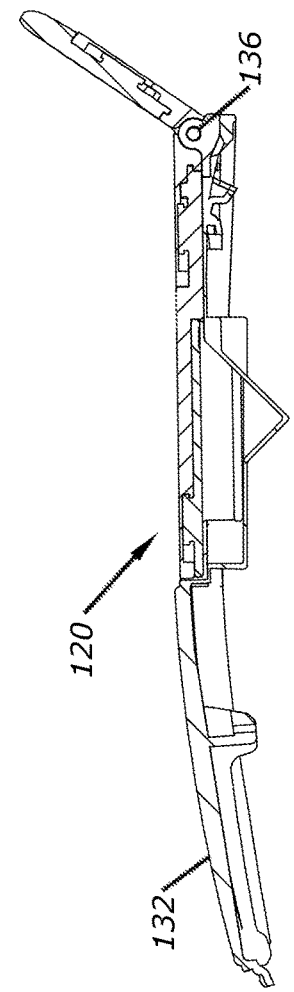

In the alternative, the base 122 may comprise multiple components. In a further alternative, the base 122 is attachable to a surface (not shown) that may be a surface on a vehicle (e.g., aircraft) bulkhead, an exterior side of a vehicle chair or a side of a console housing or compartment located next to or part of a vehicle passenger seat or chair. As seen in FIG. 18, the base 122 is attachable to the armrest cap 132 using mechanical fasteners (e.g., screws, nuts and bolts, etc.), the base 122 may alternatively be attached using chemical fasteners (e.g., glue, adhesive, etc.) or the like. In the alternative, the base 122 (or at least a portion thereof) may be formed of single-piece construction with the armrest cap 132 or another surface (e.g., formed as part of a seating console in a passenger aircraft).

The armrest cap 132 includes a recess 138 formed therein. The pivot arm 124 is rotated about the pivot axis 136 and moved into the recess 138 when the mounting arm assembly 120 is moved from an at least partially deployed configuration into the stowed configuration. Similarly, the pivot arm 124 is rotated about the pivot axis 136 and moved outward from the recess 138 when the mounting arm assembly 120 is moved from the stowed configuration to an at least partially deployed configuration. The base 122 includes a stop 139 which prevents further rotation of the pivot arm 124 when the stop 139 engages a lower portion of the pivot arm 124, and therefore limits rotation of the pivot arm 124 as the pivot arm 124 moves from its stowed position to its deployed position. This, in turn, limits rotation of the overall mounting arm assembly 120 about the pivot axis 136 as the assembly 120 moves from its stowed configuration to its deployed configuration. In the alternative, an armrest does not have a separate armrest cap 132, and a recess is formed on a top surface thereof from which the mounting arm assembly 120 may be deployed and into which the mounting arm assembly 120 may be stowed.

The mounting arm assembly 120 is stowed generally within the recess 138 of the armrest 126 when the mounting arm assembly 120 is in the stowed configuration. The recess 138 is sized and shaped to receive the mounting arm assembly 120. A side 140 of the mounting arm assembly 120 faces outward from the recess 138 and forms at least a portion of an upper, exterior surface 142 of the armrest 126 generally conforming with a remaining portion of the upper, exterior surface 142 of the armrest 126 when the mounting arm assembly 120 is in the stowed configuration. The side 140 of the mounting arm assembly 120 is comprised of a side 144 of the pivot arm 24 and a side 143 of the tilt arm 128. Sides 145, 147 of the mounting arm assembly 120 face outward from the recess 138 such that the sides 145, 147 each form at least a portion of a respective side, exterior surface 154, 156 of the armrest 126 generally conforming with respective remaining portions of the side, exterior surfaces 155, 157 of the armrest 126 when the mounting arm assembly 120 is in the stowed configuration.

The pivot arm 124 includes a track 146 and a rotation receptacle 148. The track 146 may come in various forms including, but not limited to, a slot extending through the body of the pivot arm 124, a channel recessed a depth within the body of the pivot arm 124, or the like. The length and shape (e.g., generally arcuate) of the track 146 controls the amount by which the tilt arm 128 can rotate relative to the pivot arm 124 between the stowed and deployed positions of the tilt arm 128. The tilt arm 128 includes a rotation pin 150 and a pin 152 that engage, respectively, the rotation receptacle 148 and the track 146. FIGS. 20I-J illustrates a snap method used to engage the pivot arm 124 and the tilt arm 128 where FIG. 20I shows initial positioning of the pins 150, 152 relative to the rotation receptacle 148 and track 146 and FIG. 20J shows positioning of the pins 150, 152 relative to the rotation receptacle 148 and track 146 after the tilt arm 128 is moved into snap engagement with the pivot arm 124. This snap method is shown in relation to the pivot arm 124 and the tilt arm 128 but is similar to/same as the snap method used for engagement of the tilt arm 128 and the mount 130 (this snap method may also be adapted for engaging the pivot arm 24 and tilt arm 28, as well as the tilt arm 28 and the mount 30, of mounting arm assembly 20). The rotation pin 150 snaps into and engages the rotation receptacle 148. When the rotation pin 150 engages the rotation receptacle 148, the pin 152 slides into and engages the track 146, such that the track 146 limits rotation of the tilt arm 128 relative to the pivot arm 124. The tilt arm 128 includes a rotation pin 150 and a pin 152 that engage, respectively, the rotation receptacle 148 and the track 146. The rotation pin 150 snaps into and engages the rotation receptacle 148. When the rotation pin 150 engages the rotation receptacle 148, the pin 152 slides into and engages the track 146, such that the track 146 limits rotation of the tilt arm 128 relative to the pivot arm 124. The track 46 is open to the rotation receptacle 148 to aid in receiving the pin 152 in order to engage the track 46. The receptacle 148 includes a notch 149 to aid in the pin 150 engaging the receptacle 148 with a neck 151 of the pin 150 engaging the notch 149 and an upper, outwardly extending circular flange 153 of the pin 150 engaging a retaining lip 155 of the receptacle 148.

The tilt arm 128 rotates about a tilt axis 158 (running generally through a center of the rotation pin 150 engaged to the rotation receptacle 148) as the tilt arm 128 is moved between its stowed and deployed positions. The length and shape of the track 146 limits rotation of the tilt arm 128 about the tilt axis 158 between about zero (0) degrees from a longitudinal axis 160 of the pivot arm 124 in the tilt arm's 128 stowed position to about thirty (30) degrees from the longitudinal axis 160 of the pivot arm 124 in the tilt arm's 128 deployed position. The rotation of the tilt arm 128 relative to the pivot arm 124 is limited in order to allow the PED 22 to be more centered and, in the situation where the mounting arm assembly 120 is deployed from the armrest 126 of an airline seat, positioned above a tray table associated with the airline seat. There is sufficient frictional engagement between the tilt arm 128 and the pivot arm 124 such that the weight of the PED 22 does not move the tilt arm 128 relative to the pivot arm 124.

The tilt arm 128 includes a rotation receptacle 162, and a flange 164 having a stop 166. The flange 164 and position of the stop 166 define the amount by which the mount 130 can rotate relative to the tilt arm 128 between the stowed and deployed positions of the mount 130. The mount 130 includes a rotation pin 168 and a stop surface 170 that engage, respectively, the rotation receptacle 162 and the stop 166. The rotation pin 168 snaps into and engages the rotation receptacle 162. The rotation receptacle 162 includes a notch 163 to aid in the pin 168 snap engaging the receptacle 162 with a neck 169 of the pin 168 engaging the notch 163 and an upper, outwardly extending circular flange 171 of the pin 168 engaging a retaining lip 165 of the receptacle 162. The mount 130 includes a holder 172 for receiving a portion of the PED 22. The holder 172 may be sized and shaped so as to frictionally engage the PED 22 so as to hold the PED 22 in place. The holder 172 includes a base 174, where the base 174, a first wall 176, and an opposite second wall 178 spaced apart by a space from the first wall 176 define a generally L-shaped shelf extending away from a generally planar surface of the mount 130) that in turn defines an elongated channel, slot or groove of the holder 172 such that a PED 22 can be positioned on the base 174, between the first and second walls 176, 178. The first wall 176 extends away from the base 174. The second wall 178 is the generally planar surface of the mount 130. The channel may be lined with a material, such as silicon, foam, rubber or the like in order to provide a shock-absorbing, resilient surface between the PED 22 and the mount 130 when the PED 22 is positioned in the holder 172, that also frictionally engages the PED 22 to hold the PED 22 in engagement with the mount 130 when positioned on the mount 130.

The tilt arm 128 includes a recess 180 formed therein, generally sized and shaped to receive the mount 130 such that a main body portion 182 of the mount 130 is nestled within the recess 180 when the mount 130 is rotated into its stowed position.

The mount 130 rotates about a mount axis 188 (running generally through a center of the rotation pin 168 engaged to the rotation receptacle 162) as the mount 130 is moved between its stowed and deployed positions. The mount 130 may include indicia in the form of an arrow (see, e.g., FIGS. 18 and 20G) that may be accompanied by indicia in the form of words (e.g., "TO DEPLOY" or "OPEN") that indicate the direction the mount 130 should be rotated about the mount axis 188 towards a deployed position. The position of the stop 166 limits rotation of the tilt arm 128 about the mount axis 188 in the direction of deployment when the stop 166 engages a bottom side 190 of the mount 130. The mount 130 is about sixty (60) degrees from a longitudinal axis 192 of the tilt arm 128 when the mount 130 is rotated into the mount's 130 fully deployed position (about ninety (90) degrees from the longitudinal axis 160 of the pivot arm 124 in the mount's 130 fully deployed position). The total rotation of the mount 130 from its stowed position to its deployed position is about two hundred forty (240) degrees about the mount axis 188. The rotation of the mount 130 relative to the tilt arm 128 is limited in order to allow the PED 22 to be more centered and, in the situation where the mounting arm assembly 120 is deployed from the armrest 126 of an airline seat, positioned above a tray table associated with the airline seat. There is sufficient frictional engagement between the mount 130 and the tilt arm 128 such that the weight of the PED 22 does not move the mount 130 relative to the tilt arm 128. In its deployed position, the mount 130 extends outwardly away from the tilt arm 128 and is oriented generally perpendicular to the pivot arm 124. In an alternative, the mount 130 is rotatable about the longitudinal axis of the mount 130 such that the PED 22 can be tilted up to about fifteen degrees towards or away from the user (about a thirty degree range of rotation).

In the alternative, the pivot arm 124 is constructed so that the pivot arm 124 can rotate about its longitudinal axis, the tilt arm 128 is constructed so that the tilt arm 128 can rotate about its longitudinal axis, and the mount 130 is constructed so that the mount 130 can rotate about its longitudinal axis, with there being sufficient rotational resistance to the weight of a PED 22 so as to maintain the various components of the mount arm assembly 120 in position when the mount arm assembly 120 holds a PED 22.

Alternatively, the recess 138 also includes an aperture (not shown) though which a user/passenger can access a USB port or the like in order to re-charge a battery of the PED or connect the PED to the IFE system via an adapter cord/cable having a connector compatible with and engaging the PED on one end and a connector compatible with and engaging the USB port in the recess 138 on the other end. In a further alternative, an adapter cord/cable connected to a wire harness (e.g., a wire harness connected to the IFE system or the like, where the wire harness can be in the form of a bundle of electrical wires with specialized connectors at each end) can be extended from the aperture in the recess 138 and operationally connected to the PED, with the adapter cord/cable automatically retracting to the aperture in the recess 138 when disengaged from the PED.

In a further alternative, the wire harness could be routed through or along the exterior of the mounting arm assembly. The wire harness could have a connector at one end extending through an aperture on the shelf of the mount where the connector electro-mechanically engages a PED positioned on the mount. The wire harness could be routed through or along the mount, tilt arm, and pivot into the armrest where the wire harness connects to the sources of IFE content and power. In another alternative, PEDs containing music, video, and other content, could be similarly attached, and in some cases, could be integrated into the IFE system in such a way as to permit cooperative use of a video monitor integrated into an airline seat (e.g., integrated into the seatback of an airline seat facing a passenger or attached to a video arm deployable from a seat console, etc.) and related controls (i.e., effectively running the stored music and videos through the embedded IFE system).

Upon full deployment, the mounting arm assembly 120 must firmly hold the PED 22 in place while the aircraft (or other vehicle) moves and/or vibrates. Therefore, to prevent unwanted upward or downward motion of the mounting arm assembly 120, there is sufficient frictional engagement between the pivot arm 124, tilt arm 128, and mount 130 to counteract the weight of the mounting arm assembly 120 and PED 22, plus any additional amount of grip needed to account for turbulence in flight and/or other sources of vibration. The frictional engagement of the components of the mounting arm assembly 120 must not only support the PED 22, holding the PED 22 firmly in place, but also allow the mounting arm assembly 120 to be easily adjusted manually by the passenger and it must maintain that adjustment once made.

As discussed above, the base 122 is removably connected to the armrest cap 132 of the armrest 126 such that the base 122 is stationary relative to the armrest cap 132. A mounting plate 196 is secured to the armrest 126. When the armrest cap 132 is secured to the armrest 126 (e.g., snap-fit attachment, mechanical fasteners or the like), an attachment screw 198 is inserted through an aperture 200 in the armrest cap 132 and into removable engagement with a bore 202 on the mounting plate 196. A pair of attachment screws 204 are inserted through respective apertures 206 in the base 122 (previously positioned in place on the armrest 132) and into removable engagement with respective bores 208 in the armrest cap 132. The pivot arm 124 is mounted to the base 122 by aligning bores 210 on each side of the pivot arm 124 with a bore 212 extending through the base. A pair of dowel pins 214 are used to secure the pivot arm 124 to the base 122 by inserting the dowel pins 214 through the aligned bores 210, 212 on each side of the pivot arm 124. The above described process of securing the pivot arm 124 of mounting arm assembly 120, described above with respect to FIGS. 11-20D, to the armrest cap 132 can adapted to secure the mounting arm assembly 20, described above with respect to FIGS. 1-10C, to the armrest cap 32.

In use, the deployment stages required to bring the mounting arm assembly 120 to a proper viewing position of a PED 22 held by the assembly 120 are as follows: stowed position, initial deployment, secondary deployment, and final deployment. In the stowed position, the mounting arm assembly 120 is contained in the recess 138 of the armrest 126 (for purposes of illustration only, the armrest 126 is the passenger's left armrest, and the following steps can be adopted and modified for the situation where the mounting arm assembly 120 is stowed within a passenger's right armrest, with the goal that the assembly 120 be deployed generally in front of the passenger). Alternatively, the assembly 120 may be stowed within a recess of a space within a housing or console, in a space between passenger chairs, or in a space between a passenger chair and a bulkhead, and so on. In any event, in the stowed position, the mounting arm assembly 120 is out of sight of the passenger except for the sides 140, 154, 156 of the mounting arm assembly 120 facing outwardly from the recess 138 and forming at least a portion of the upper, exterior surface 142 and side exterior surfaces 155, 157 of the armrest 126. In the initial deployment stage, the mounting arm assembly 120 is pivoted vertically from within the recess 138 in which it is stowed. This initial deployment is accomplished by one or more fingers of a user engaging the flange 164 and allows the user to then manually pull the assembly 120 further pivotally upwards about the pivot axis 136 so that the pivot arm 124 is fully pivotally extended from its stowed position. The flange 164 may releasably engage the armrest cap 132 (e.g., by snap-fit/detent engagement of the flange 164 and the armrest cap 132). The stop 139 of the base 122 acts as a hard stop to the rotation of the pivot arm 124, when the stop 139 engages a portion of the pivot arm 124 shaped and positioned to engage the stop 139, and thereby limits outward rotation of the pivot arm 124. The pivot arm 124 rotates about one hundred twenty five (125) degrees between its fully stowed and fully deployed positions.

In the alternative, the mounting arm assembly 120 also includes a latch mechanism used to hold the assembly 20 in a stowed configuration and release the assembly 120 from the stowed position when a user desires to move the assembly 120 into a deployed configuration. The user could actuate the latch mechanism either by pushing a mechanical button associated with the latch mechanism operationally connected to the assembly 120, or by pressing against the side 140 of the assembly 120, activating a release mechanism, or by any other means that will disengage the latch holding the assembly 120 in place in the stowed position. Pushing the button or the side 140 releases the latch mechanism and allows the user to then manually pull the assembly 120 further pivotally upwards about the pivot axis 136 so that the pivot arm 124 is fully pivotally extended from the stowed position.

In secondary deployment, the passenger rotates the tilt arm 128 clockwise about the tilt axis 1158. As discussed above, the length and shape of the track 146 limits rotation of the tilt arm 128 about the tilt axis 158 between about zero (0) degrees from a longitudinal axis 160 of the pivot arm 124 in the tilt arm's 128 stowed position to about thirty (30) degrees from the longitudinal axis 160 of the pivot arm 124 in the tilt arm's 128 deployed position. This allows any PED 22 eventually mounted on the mount 130 to be more centered in front of the passenger and brings the PED 22 into a viewing plane of the passenger. This also positions the PED 22 above a tray table, if any, in front of the passenger.

In the final deployment stage, the passenger rotates the mount 130 clockwise about the mount axis 184 until the stop 166 engages the bottom side 190 of the mount 130. A PED 22 can be placed within the holder 192. In general, the mounting arm assembly 120 may be stowed by adapting the deployment steps, described above, to be executed in reverse order.

Figure 24:
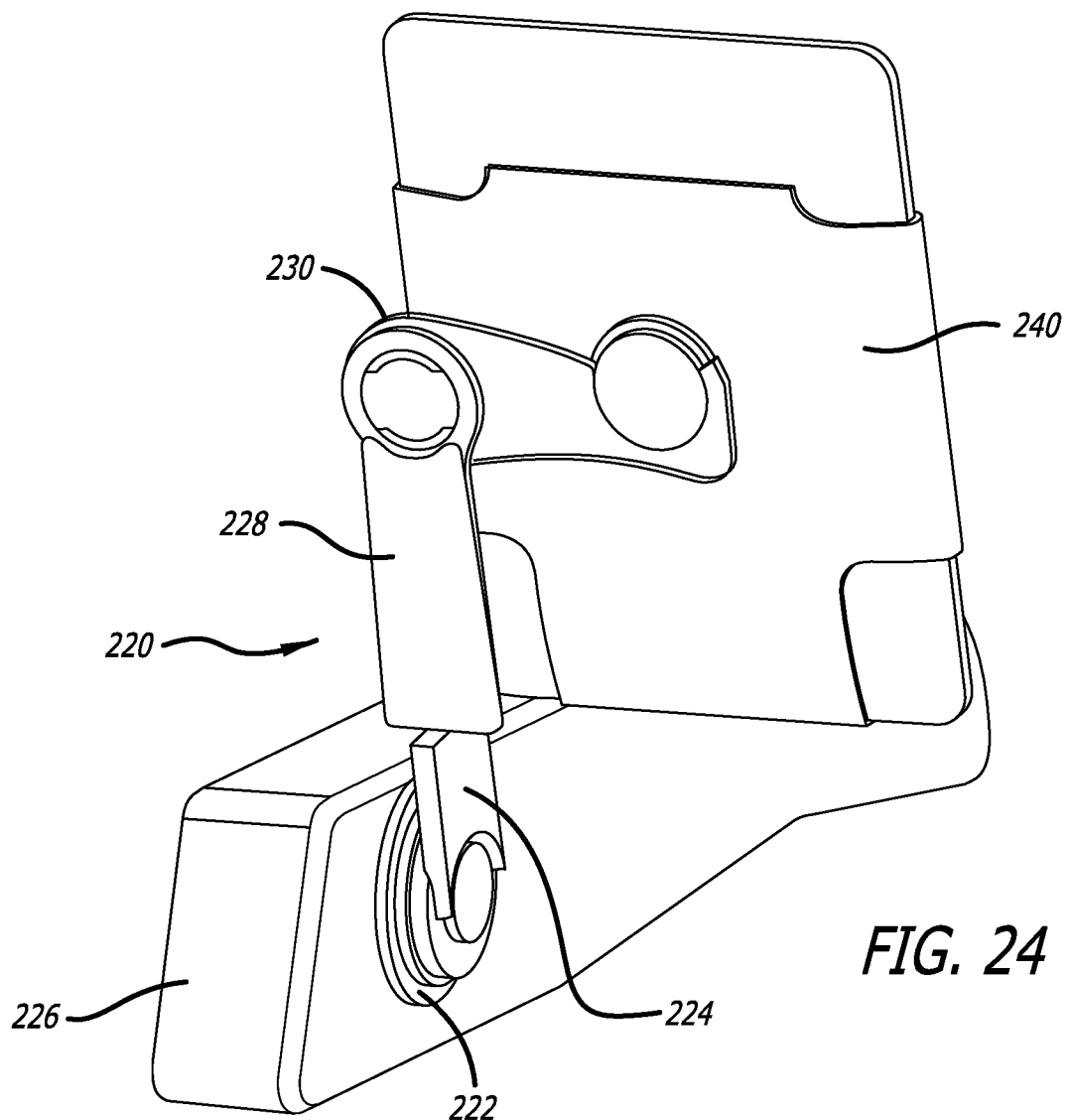
FIG. 24 is a perspective view of the mounting arm assembly of FIG. 23, as seen from another angle.

As shown in FIGS. 23-26 for purposes of illustration, yet another embodiment of the present invention resides in a mounting arm assembly 220, similar to mounting arm assemblies 20, 120 described above, for a personal electronic device (PED) 22. As described above, the PED 22 can be in the form of various types of electronic devices including, but not limited to, a notebook computer, a media player, a smartphone, a tablet-style device, or other portable electronic devices containing music, video, and other content and/or capable of WIFI and/or BLUETOOTH access. The mounting arm assembly 220 is movable between stowed and deployed configurations. The assembly 220 includes a base 222, a pivot arm 224 pivotally engaging the base 222. The base 222 is removably connected to an armrest 226 of a seat (not shown) such that the base 222 secures the mounting arm assembly 220 to the armrest 226. A tilt arm 228 is pivotally connected to the pivot arm 224, and a mount 230 is pivotally connected to the tilt arm 228. The mount 230 supports the PED 22 when the mounting arm assembly 220 is in its deployed configuration. As seen in FIG. 24, the tilt arm 228 rotates about a longitudinal axis of the pivot arm 224.

A PED holder 240 may be removably connected to the mount 230. The PED holder 240 may be stowed with the mount 230 or attached to the mount 230 upon at least partial deployment of the mounting arm assembly 220. The PED 22 may be pre-attached to the holder 240. For example, where the PED 22 is an airline-supplied PED, the PED 22 may be provided free to a passenger by the airline for the duration of the flight or provided as a rental to the passenger by the airline for the duration of the flight. Either way, the PED 22 is attached to the holder 240 when provided to the aircraft passenger(s). The holder 240 is subsequently removably, snap-fit engaged to the mount 230. In another alternative, the airline could provide a passenger with a selection of a variety of alternatively shaped holders (e.g., a holder for a tablet-type device, a holder for a smartphone device, a holder for any one of a variety of other types of PEDs, etc.), with the actual holder to be used depending on the holder which is most compatible with the passenger's own PED (i.e., the type of holder depending on the type of device), and the selected holder removably, snap-fit engaged to the mount 230.

Upon full deployment, the mounting arm assembly 220 must firmly hold the PED 22 in place while the aircraft (or other vehicle) moves and/or vibrates. Therefore, to prevent unwanted upward or downward motion of the mounting arm assembly 220, there is sufficient frictional engagement between the pivot arm 224, tilt arm 228, and mount 230 to counteract the weight of the mounting arm assembly 220 and PED 22, plus any additional amount of grip needed to account for turbulence in flight and/or other sources of vibration. The frictional engagement of the components of the mounting arm assembly 220 must not only support the PED 22, holding the PED 22 firmly in place, but also allow the mounting arm assembly 220 to be easily adjusted manually by the passenger and it must maintain that adjustment once made.

Figure 25:
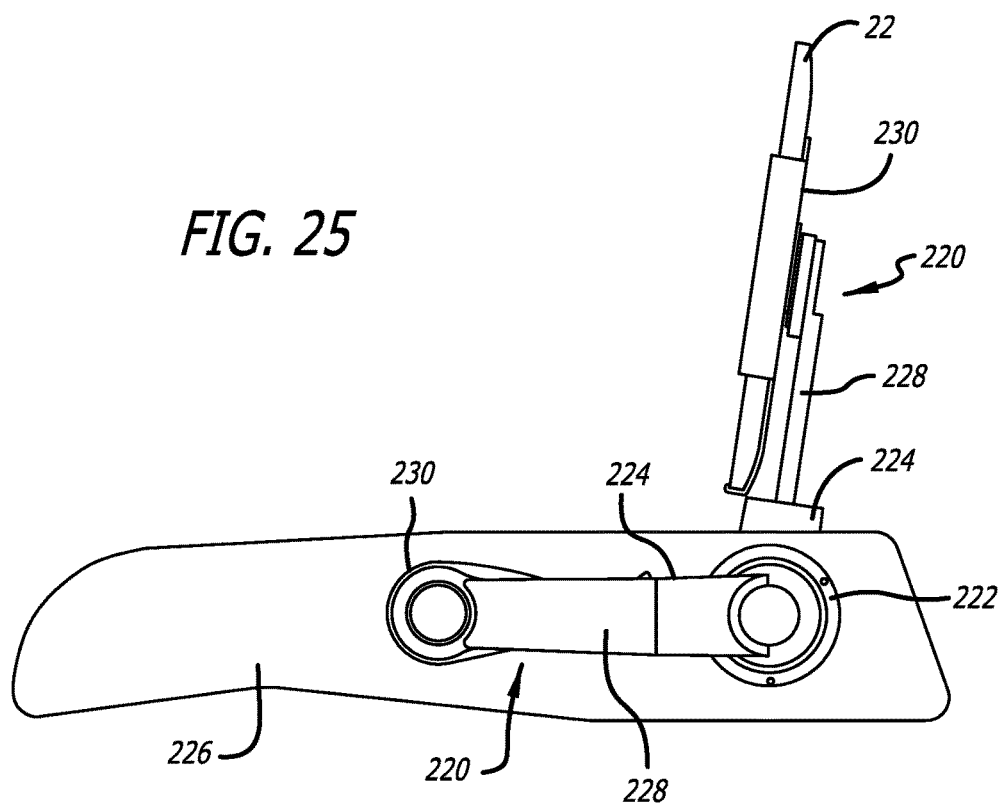
FIG. 25 is a right side view of FIG. 23, illustrating a stowed mounting arm assembly on a right side of the armrest (seen without a holder attached to the mount) and the deployed mounting arm assembly seen in FIG. 23 on a left side of the armrest.
Figure 26:
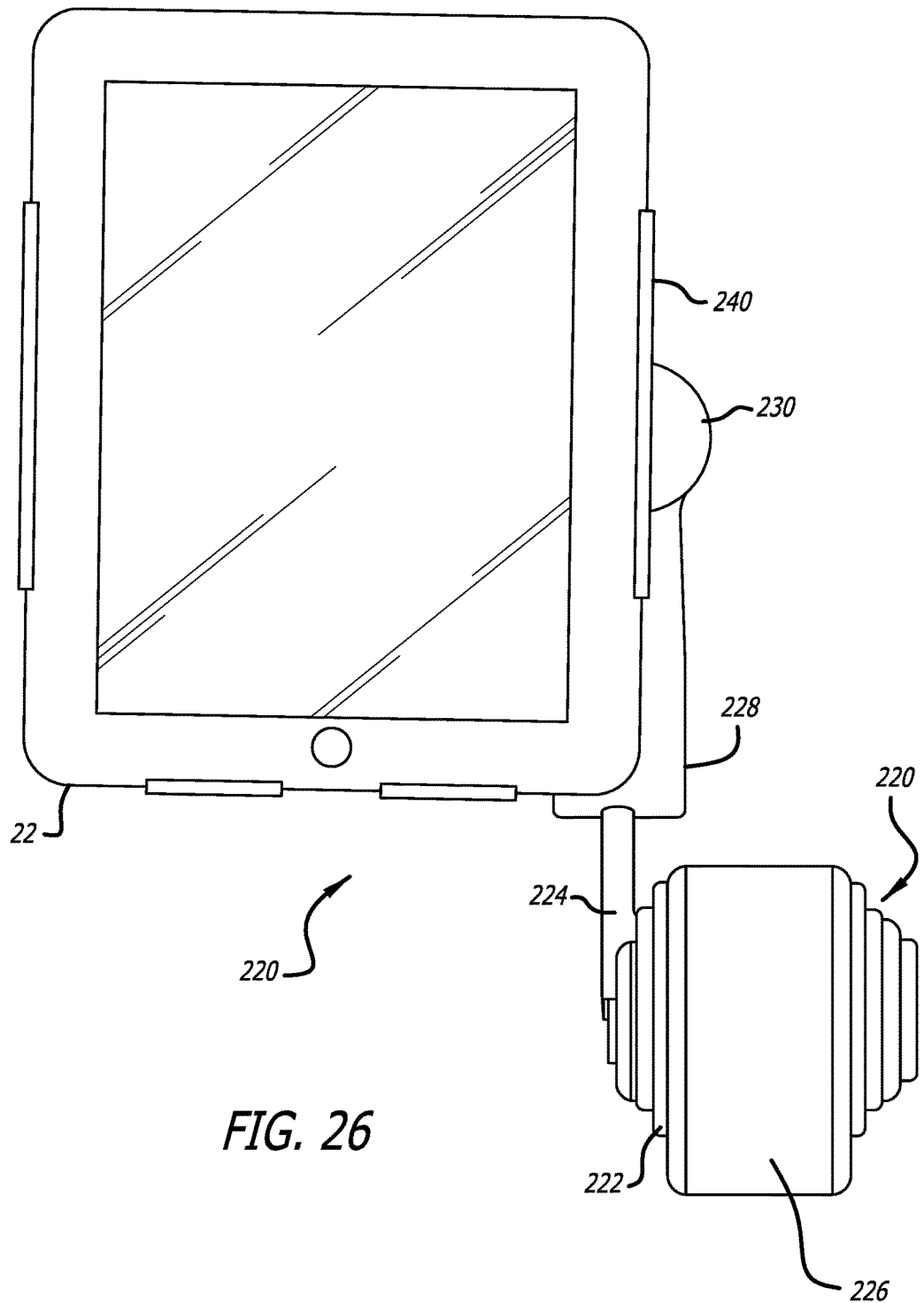
FIG. 26 is a front side view of the stowed and deployed mounting arm assemblies seen in FIG. 25.

In use, the deployment stages required to bring the mounting arm assembly 220 to a proper viewing position of a PED 22 held by the assembly 220 are as follows: stowed position, initial deployment, secondary deployment, and final deployment. In the stowed position, the mounting arm assembly 220 is positioned on a side of the armrest 126 (as seen in FIG. 25 with regard to the mounting arm assembly 220 (seen without a holder 240 attached to the mount 230) on the right side of the armrest 226). Alternatively, the assembly 220 may be stowed within a recess on the side of the armrest 226, a recess of a space within a housing or console, in a space between passenger chairs, or in a space between a passenger chair and a bulkhead, and so on. In the initial deployment stage, the mounting arm assembly 220 is pivoted vertically about ninety (90) to one hundred twenty five (125) degrees from the orientation in which it is stowed between its fully stowed and fully deployed positions. This initial deployment is accomplished by one or more fingers of a user manually pulling the assembly 220 pivotally upwards about a pivot axis of the base 222 so that the pivot arm 224 is fully pivotally extended from its stowed position.

In secondary deployment, the passenger rotates the tilt arm 228 approximately ninety (90) degrees about a longitudinal axis of the pivot arm 224. This allows any PED 22 mounted on the holder 240 of the mount 230 to be more centered in front of the passenger and brings the PED 22 into a viewing plane of the passenger. This also positions the PED 22 above a tray table, if any, in front of the passenger.

In the final deployment stage, the passenger rotates the mount 230 about a mount axis to adjust tilt of the PED 22. The PED 22 can be placed within the holder 240. In general, the mounting arm assembly 220 may be stowed by adapting the deployment steps, described above, to be executed in reverse order.

The mounting arm assembly 20, 120, 220 may be generally made from various materials including, without limitation, plastic (e.g., polycarbonate), metal (e.g., aluminum), etc. The mounting arm assembly 20, 120, 220 as shown may in the alternative include any of various features not shown. For example, a reading light (not shown) could be attached to an underside of the mount 30, 130, 230, powered separately or by batteries or as connected to the wire harness, so that the passenger could read (e.g., magazines, newspapers, books, or the like), or write down information while also viewing the display screen of the PED 22.

Although the present invention has been discussed above in connection with use on a passenger aircraft, the present invention is not limited to that environment and may also be used on passenger trains, cars, buses and other vehicles including, but not limited to, carts, carriages, and means of transportation mounted on rails.

Likewise, the present invention is also not to be limited to use in vehicles and may be used in non-vehicle or stationary environments where there is seating, and it is desirable to stow and deploy mounting arms for holding personal electronic devices, such as restrooms, sports stadiums, film sets, schools, hospitals, factories, garages, offices, shipyards, construction sites and the like. Furthermore, the present invention is also not to be limited to use in connection with seating, and may be used in any environment where the device may be stowed within and deployed from a recess formed in a surface (e.g., a wall, a desktop, a table) or attached to a flat surface (e.g., a wall, a desktop, a table) that does not have a recess into which the device may be stowed.

Furthermore, the present invention is not limited to use with personal electronic devices, and may be used with a wide variety of electronic, mechanical, electro-mechanical, or other devices or objects, such as books, magazines, photographs, paper pads, keypads, illumination sources, cameras, or any other kind of screen display, tool, or other component requiring or benefitting from single- or multi-axis articulation, with or without internal wiring, fiber-optics, or other items running through the center of the arm.

In addition, the claimed invention is not limited in size and may be constructed in miniature versions or for use in very large-scale applications in which the same or similar principles of motion and friction control as described above would apply. Furthermore, the figures (and various components shown therein) of the specification are not to be construed as drawn to scale.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The terminology used herein is for the purpose of describing particular example embodiments only and is not intended to be limiting. As used herein, the singular forms "a", an and the may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being on, "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "front," "rear," "left," "right," "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A mounting arm assembly movable between stowed and deployed configurations, comprising:
   a pivot arm pivotally engaging an armrest of a seat;
   a tilt arm engaging the pivot arm; and
   a mount engaging the tilt arm configured to support a personal electronic device; wherein the mount rotates laterally relative to the tilt arm between stowed and deployed positions of the mount, wherein the tilt arm includes a recess formed therein, generally sized and shaped to receive a main body portion of the mount when the mount is in the stowed position; and wherein a first surface of the main body portion of the mount is generally co-planar with a first surface of the tilt arm when the mount is in the stowed position.

2. The assembly of claim 1, wherein the mounting arm assembly is stowed generally within a recess of the armrest when the mounting arm assembly is in the stowed configuration, the recess sized and shaped to receive the mounting arm assembly, wherein a side of the mounting arm assembly faces outward from the recess and forms at least a portion of an upper, exterior surface of the armrest generally conforming with a remaining portion of the upper, exterior surface of the armrest.

3. The assembly of claim 1, wherein the tilt arm rotates relative to the pivot arm between stowed and deployed positions.

4. The assembly of claim 1, wherein the pivot arm rotates relative to the armrest between stowed and deployed positions.

5. The assembly of claim 1, wherein the pivot arm includes a track, the tilt arm engages the track, and the track limits rotation of the tilt arm relative to the pivot arm.

6. The assembly of claim 5, wherein the tilt arm includes a pin engaging the track.

7. The assembly of claim 1, wherein the pivot arm limits rotation of the mounting arm assembly between the stowed and deployed configurations.

8. The assembly of claim 1, wherein the armrest includes a recess formed therein into which the pivot arm is rotated from an at least partially deployed configuration and from which the pivot arm is rotated from the stowed configuration.

9. The assembly of claim 1, wherein the pivot arm pivotally engages an armrest cap of the armrest, wherein the armrest cap includes a recess formed therein into which the pivot arm is rotated from an at least partially deployed configuration and from which the pivot arm is rotated from the stowed configuration.

10. The assembly of claim 1, wherein the mount includes a generally L-shaped shelf extending away from a generally planar surface of the mount, defining a channel for receiving a portion of the personal electronic device.

11. The assembly of claim 1, including a holder for retaining the personal electronic device; wherein the holder removably engages the mount.

12. The assembly of claim 1, wherein the tilt arm includes a notch, and the mount includes a notch, wherein the notches of the tilt arm and mount are aligned when the mount is in the stowed position.

13. An armrest cap assembly, comprising:
an armrest cap configured to engage an armrest of a seat; and
a mounting arm assembly movable between stowed and deployed configurations, pivotally engaging the armrest cap; wherein the mounting arm assembly includes a pivot arm pivotally engaging the armrest cap, a tilt arm engaging the pivot arm; and a mount engaging the tilt arm configured to support a personal electronic device; wherein the mount rotates laterally relative to the tilt arm between stowed and deployed positions of the mount, wherein the tilt arm includes a recess formed therein, generally sized and shaped to receive a main body portion of the mount when the mount is in the stowed position; and wherein a first surface of the main body portion of the mount is generally co-planar with a first surface of the tilt arm when the mount is in the stowed position;
wherein the mounting arm assembly is stowed generally within a recess of the armrest cap when the mounting arm assembly is in the stowed configuration, the recess sized and shaped to receive the mounting arm assembly, wherein a side of the mounting arm assembly faces outward from the recess and forms at least a portion of an upper, exterior surface of the armrest cap generally conforming with a remaining portion of the upper, exterior surface of the armrest cap.

* * * * *